March 22, 1960  T. J. JOHNSON  2,929,157
FLIGHT PATTERN SIMULATOR FOR RADAR ARTIFICIAL AIRCRAFT
Filed Feb. 14, 1955  4 Sheets-Sheet 1

THOMAS J. JOHNSON,
INVENTOR.

BY
Barkelew & Scantlebury
ATTORNEYS.

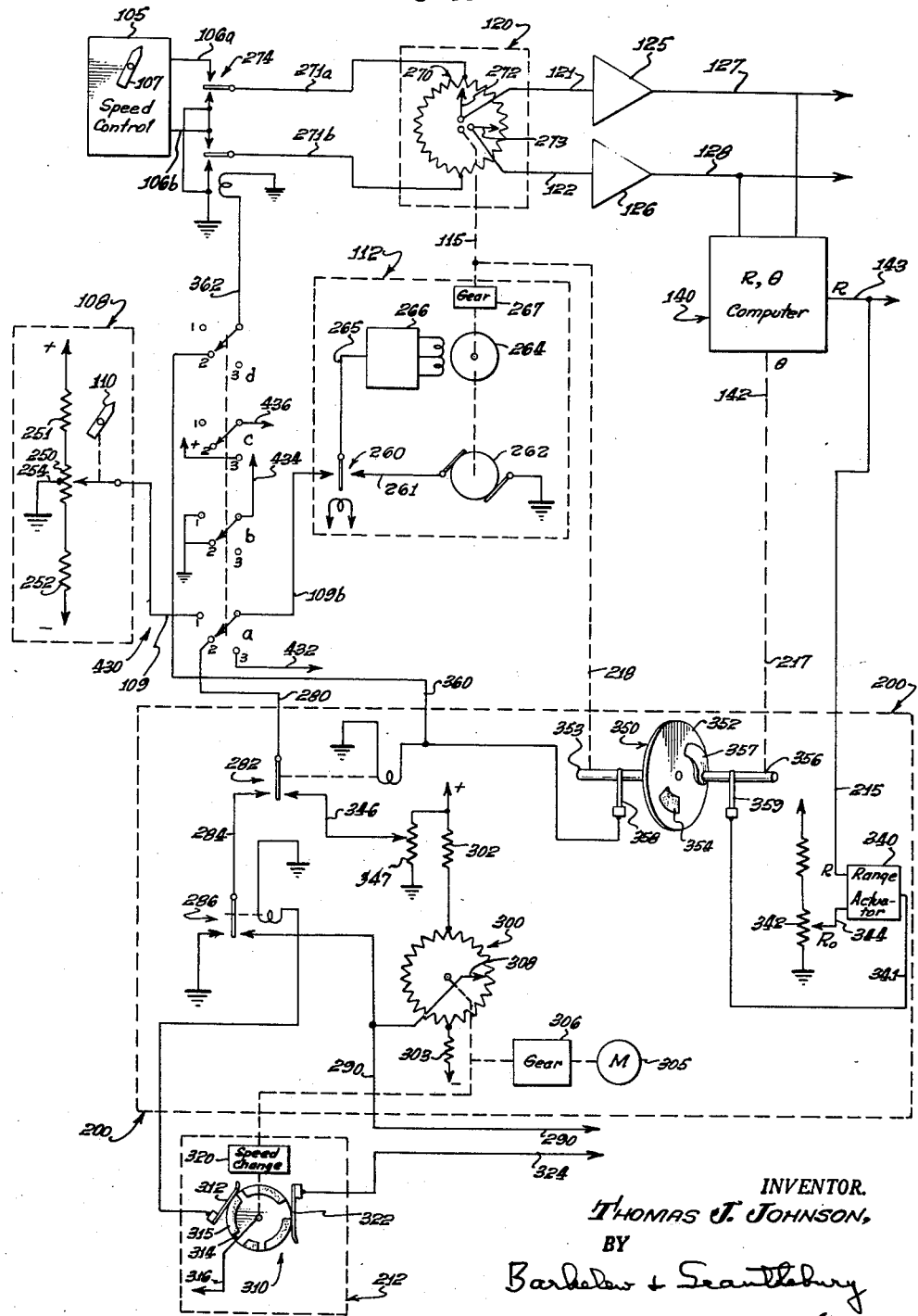

March 22, 1960  T. J. JOHNSON  2,929,157
FLIGHT PATTERN SIMULATOR FOR RADAR ARTIFICIAL AIRCRAFT
Filed Feb. 14, 1955  4 Sheets-Sheet 3
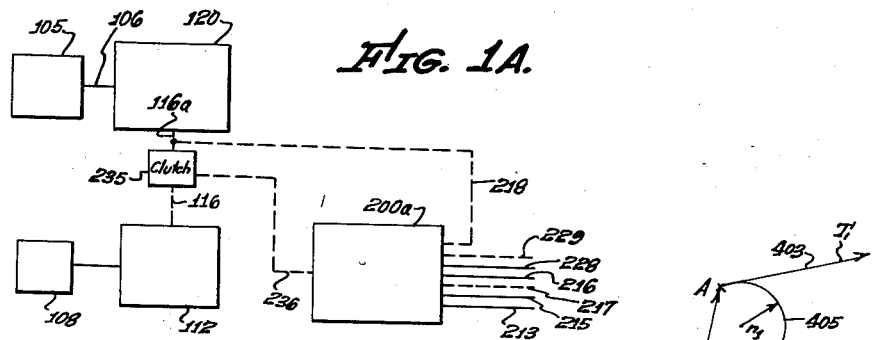
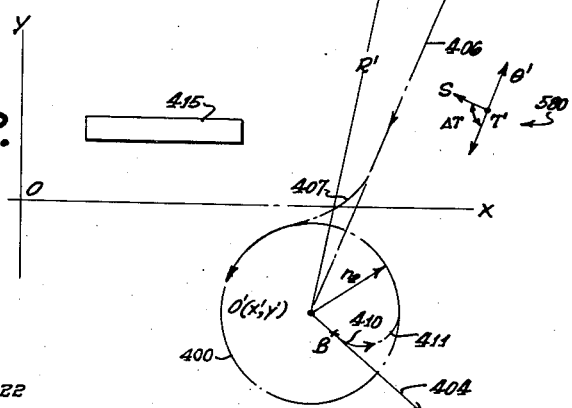
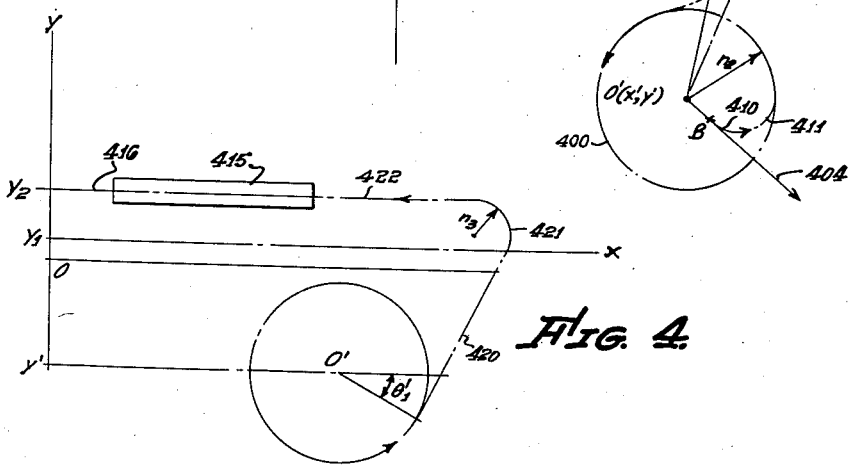
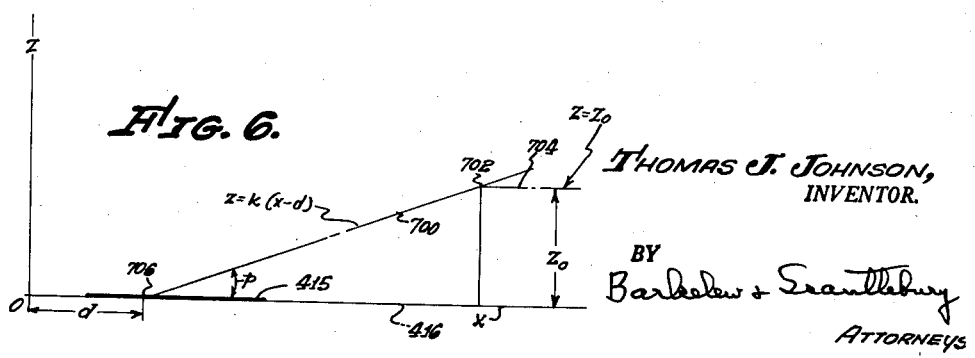
Thomas J. Johnson,
INVENTOR.
BY
Barkelew & Scantlebury
ATTORNEYS

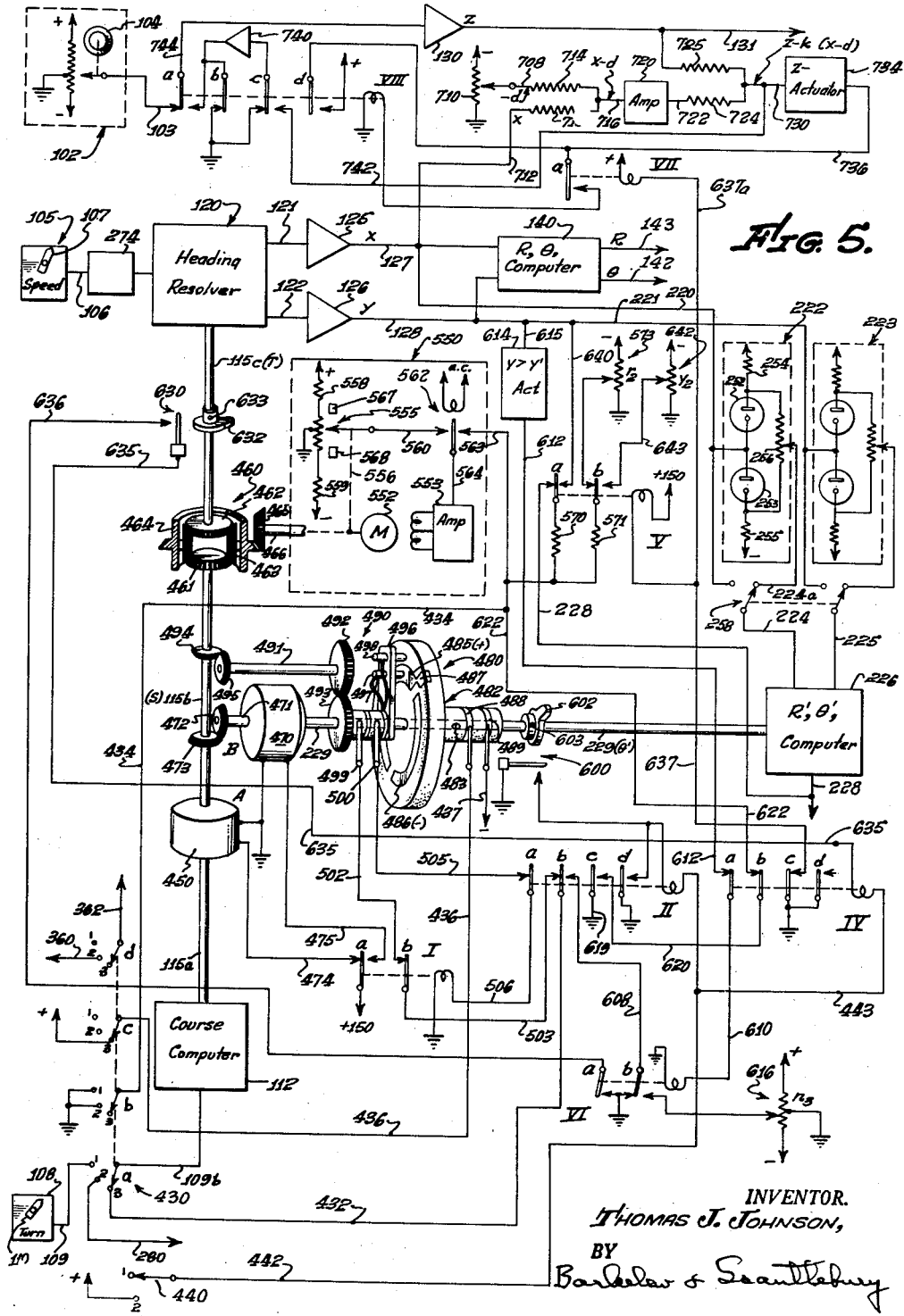

United States Patent Office 2,929,157
Patented Mar. 22, 1960

2,929,157

FLIGHT PATTERN SIMULATOR FOR RADAR ARTIFICIAL AIRCRAFT

Thomas J. Johnson, Los Angeles, Calif., assignor to Gilfillan Bros. Inc., Los Angeles, Calif., a corporation of California Application February 14, 1955, Serial No. 487,993

22 Claims. (Cl. 35—10.4)

This invention has to do with means for displaying, for example on an indicator screen of a radar system, one or more realistic representations of artificial aircraft, and for controlling the movement of such aircraft in accordance with the definite predetermined flight patterns or programs of flight.

Such representations are useful for training operators of radar equipment, for maintaining operators at peak efficiency in handling specialized problems, for checking and adjusting operation of radar systems, and for other purposes. That is particularly true in connection with radar systems employed for the control of traffic of actual aircraft, for example for guiding from the ground the approach of aircraft to a landing field.

My copending patent application, Serial No. 415,545, filed on March 11, 1954, now Patent No. 2,889,635, under the title "Artificial Aircraft Simulator For Radar Systems," describes and claims systems for displaying one or more artificial aircraft on a radar indicator screen and for producing realistic movement of such aircraft by means of direct control that may be imposed in terms of the normal flight variables of the aircraft. In order to simulate the effects of high traffic density, such as normally exists near a landing field during actual ground controlled approach operations, and for other purposes, it may be desirable to present a relatively large number of such artificial aircraft on the radar screen. Those artificial aircraft that are not being positioned for landing by the student operators, for example, are preferably maneuvered in such a manner as to appear to be performing flight patterns of the type that normally occur in such traffic. An important object of the present invention is to provide means for producing such flight patterns without requiring detailed manual control of the individual artificial aircraft.

The invention is capable of providing programmed flight of many different types, some of which are relatively simple in organization, and some of which may involve a relatively complex sequence of evolutions. Such flight pattern may require control only in a horizontal plane or only in elevation, or may include integrated control in both horizontal and elevation dimensions. The detailed structure by which such control is achieved necessarily depends upon the particular nature of the required flight patterns, and may vary widely even for a single flight pattern.

The present invention is not limited to any particular type of system. However, for definiteness and clarity of description, and without implying any limitation thereto, the invention will be described largely as it relates to an artificial aircraft system of the general type described in the copending application already referred to.

It will be understood that an aircraft simulator may, and preferably does, include means for displaying and controlling more than one artificial aircraft. For that purpose all of the detailed mechanism to be described may be duplicated to whatever extent is required, the video output from each such channel then representing an individual, independently controllable artificial aircraft. Those video outputs may be mixed in any suitable manner for supply to the radar display system. It is convenient, particularly when a relatively large number of artificial aircraft channels are thus provided, to relieve the operator of the need continuously to control the flight of all the aircraft represented. It is also desirable to provide means for automatically producing definitely predetermined types of flight of one or more of the available artificial aircraft.

In accordance with the present invention, each artificial aircraft is preferably shiftable selectively between automatic control in accordance with a predetermined program and manual control, for example of the type described in the above identified copending application. That manual control is preferably carried out in terms of the same variables that primarily determine the flight of a real aircraft. In preferred form, that control may be carried out in terms of speed and rate of turn of the aircraft, and also in terms of rate of climb in those systems that include indication of elevation or of elevation angle. Means are then typically provided for deriving from a speed signal and a rate of turn signal, for example, other signals that represent such variables as angle of heading, components of velocity in cartesian coordinates, cartesian position coordinates of the aircraft and polar position coordinates of the aircraft. From such derived functions there may then be developed a radar indication of the instant position of the artificial aircraft.

In accordance with the present invention, further variables may be derived, and may be employed, either alone or in combination with those already available, for development of control signals that correspond in any suitable manner, as will be illustratively described, to the desired flight program of the artificial aircraft. Those control signals may then be employed to control the same initial flight variables by which manual control is alternatively exercised; or to exert control more directly upon one or more of the derived variables of the simulator system. In either instance, the effect is to control the indicated movement of the artificial aircraft in accordance with the control signals.

Many different types of control signals may be employed, corresponding to various desired types of flight program and to various types of instrumentation of the radar or simulator system with which the programming equipment is intended to be operated.

Such control signals may, for example, be developed by comparing the actual values of one or more variables for the artificial aircraft with values that correspond to the desired flight pattern, and by developing a control signal of a type tending to reduce any difference between those values. Such variables, in terms of which the programmed flight may be controlled, include, for example, the heading of the artificial aircraft, its bearing and range from a predetermined position, and the value of any space coordinate, such as a cartesian coordinate, of its position.

An important feature of the invention is the development of such variables with relation to more than one position. In particular, such variables may be developed with respect to a predetermined but arbitrarily variable position, which will be referred to as the program zero, as well as with respect to the ground zero, which typically corresponds to the location of the radar antenna. Such introduction of a program zero, and development of aircraft variables with respect to that program zero, permits a wide variety of flight patterns that are defined in terms of that program zero and that may be quite independent of the ground zero. In the preferred form of the invention, the location of the program zero is conveniently variable throughout a range at least equal to the area represented by the radar screen, adding enormously to the variety of flight programs that can be produced with relatively simple equipment. When, as is preferred, several artificial aircraft are provided, separately adjustable program zeros are preferably provided for each such aircraft.

More specifically, the invention may provide, for example, means for causing an artificial aircraft to move across the radar screen in a manner that corresponds to straight line flight of an aircraft along a series of randomly selected headings, and, if desired, with apparently random changes of course from time to time during such flight. The invention may further provide automatically controlled flight of an artificial aircraft on a homing course toward either the ground zero or toward an individual program zero selected for that particular aircraft.

As a further example of the type of flight pattern that can be provided in accordance with the invention, the artificial aircraft may be caused to move in a manner that corresponds to a holding pattern, consisting typically of circular flight about an arbitrarily selected position. The invention is also capable of flying the aircraft automatically from whatever position it may occupy at a given moment to such a holding pattern; and means may be provided, for example, for causing the aircraft to leave the holding pattern at a chosen time and automatically start a normal approach to the landing field. That approach may be taken over at an early stage by return of the aircraft to manual control; or means may be provided for carrying the approach automatically to completion or to any intermediate stage. In particular such control may include, for example, automatic letdown along a predetermined glide path. Such specific flight patterns are merely illustrative of the wide variety of detailed flight patterns that can be produced in accordance with the invention.

A control system for programmed flight in accordance with the invention may be designed as a separable unit that may be connected to an artificial aircraft simulator system of the general type described in the above identified copending application, or may be incorporated in such a system. Such an overall system may comprise part of a radar system, or may be a self-contained system not directly associated with any actual radar system, but having independent display means, preferably of the same general type used in radar systems.

For purposes of illustration, the invention will be described with particular reference to a radar system of the type that is normally employed for guiding from the ground the approach of an aircraft to a landing field. Ground controlled approach (GCA) systems of known type typically comprise a search system, which produces a plan position indication (PPI) of the aircraft in the general vicinity of the landing field, and a precision system. The precision system typically produces an expanded plan position indication (EPI) of the aircraft within a limited range of azimuth that includes the glide path to the landing strip, and may produce also an expanded elevation indication covering the same region. For the sake of clarity and definiteness, the invention will be described largely with reference to the search system display of such a GCA system.

A full understanding of the invention and of its further objects and advantages will be had from the following description of certain illustrative embodiments, of which description the accompanying drawings form a part. The particulars of that description are intended only as illustration, and not as limitations upon the scope of the invention, which is defined in the appended claims.

In the drawings:

Fig. 1A is a fragmentary schematic diagram representing a modification;

Fig. 2 is a schematic diagram representing those portions of an illustrative embodiment of the invention that relate to pattern control of the type shown in Fig. 1;

Fig. 3 is a schematic plan illustrating a typical holding pattern and approaches thereto;

Fig. 4 is a schematic plan illustrating a typical transition from a holding pattern to an approach course to a landing strip;

Figure 1:
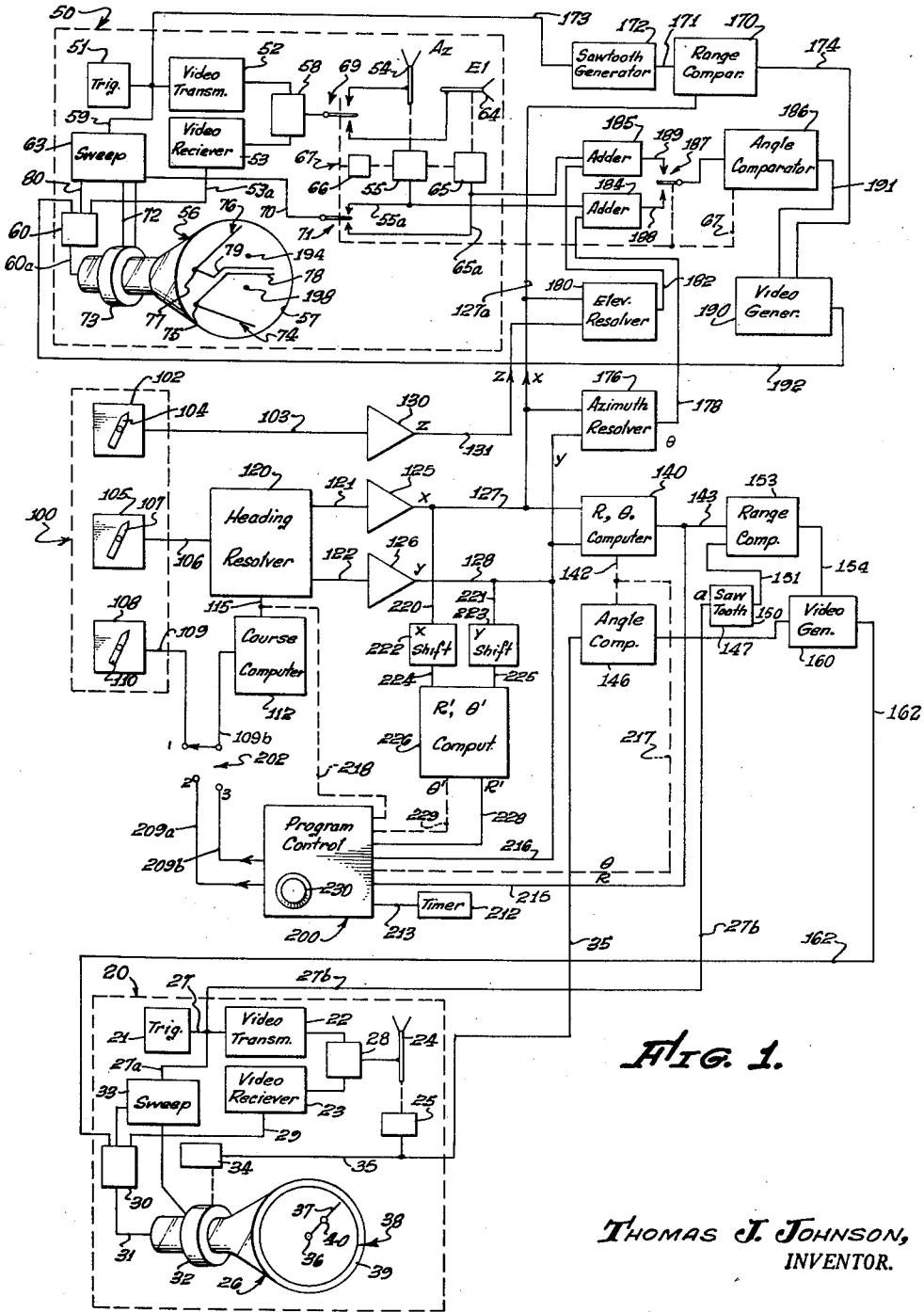
Fig. 1 is a schematic diagram representing in simplified block form an illustrative radar system and aircraft simulator in which the invention is embodied in schematic form.

Fig. 5 is a schematic diagram representing those portions of an illustrative embodiment of the invention that relate to pattern control of the type shown in Fig. 1A; Figs. 1, 2 and 5 together representing an illustrative complete system in accordance with the invention, some elements of that system being repeated in more than one of those figures for clarity of illustration; and Fig. 6 is a schematic elevation illustrating a typical glide path to a landing strip.

Referring particularly to Fig. 1, a typical search radar system is indicated in simplified block form at 20 and a typical precision radar system is similarly indicated at 50.

As illustratively shown, search system 20 comprises a timing means 21 which develops one or more periodic timing signals; a video transmitter 22 and a video receiver 23; an antenna 24 which is driven in periodic scansion movement by scansion drive means indicated at 25; and a cathode ray indicator tube 26. Video transmitter 22 receives periodic trigger pulses from timing means 21 via line 27 and produces a pulse of radio frequency energy in timed relation to each trigger. Those pulses are transmitted to antenna 24 via a transmit-receive duplexing device indicated at 28, and are radiated by the antenna as a directed radar beam, the azimuth of that beam varying periodically under control of scansion drive 25. Radio frequency energy reflected by a target within that beam is received by the antenna and transmitted via duplexer 28 to video receiver 23, by which it is amplified, detected and supplied as a video signal over line 29. That video signal is transmitted to tube 26 via mixer 30, in which it may be combined in known manner with other signals, produced by means not explicitly shown, which may represent range marks, map designations and other desired information. The resulting combined video signal is supplied via line 31 to a suitable electrode of cathode ray tube 26 in a manner to modulate the intensity of the cathode ray beam. That beam is caused to sweep across the tube screen 39 in a succession of sweep paths from a fixed zero 36. A typical sweep path is indicated at 37. Means are provided in known manner to cause the direction of that sweep path to rotate about zero 36 in direct correspondence to the scansion movement of the radar beam, typically producing a circular display, indicated at 38.

For example, a magnetic deflection yoke 32 may receive uniform periodic sweep current pulses of suitable form from sweep generating means 33, which acts to produce a sweep pulse in response to each trigger pulse received over line 27a from timing means 21; and yoke 32 may be mechanically driven in rotation about the axis of tube 26 by drive means indicated at 34, that drive means being controlled by a suitable angle signal which is received over line 35 from antenna drive means 25. That angle signal, which may typically comprise the output from a selsyn generator driven with antenna 24, continuously represents the azimuth angle of the radiated beam from antenna 24, and controls the position of yoke 32 in such a way that the direction of deflection of the cathode ray beam in its successive sweep movements on the tube screen continuously corresponds to that azimuth angle. Intensification of the cathode beam by the video signal resulting from a target echo therefore produces a visible indication on screen 39 in an azimuth sector of the screen that corresponds to the actual azimuth angle of the target with respect to antenna 24. And the radial position of that indication is determined by the distance moved by the beam along the sweep during the travel time of the radar pulse to and from the target, and represents the actual target range.

Precision radar system 50 is preferably, although not necessarily, of the type in which both the azimuth and the elevation displays appear on the screen of a single cathode ray indicator tube. That system may, for example, be of the type described and claimed in United States Patent 2,649,581, issued on August 18, 1953 to Homer G. Tasker et al., and assigned to the assignee of the present application. Such a system, as here illustratively shown in simplified schematic form, includes a timing means 51 and video transmitting means 52 that develops radio frequency energy pulses in timed relation to trigger pulses generated by the timing means. Those energy pulses are transmitted via duplexer 58 to the radio frequency switch 69, which delivers the pulses selectively either to the azimuth antenna 54 or to the elevation antenna 64, depending upon the switch position. Antennas 54 and 64 are driven in scansion in azimuth and in elevation, respectively, by respective drive mechanisms represented at 55 and 65, both those drive mechanisms being driven in timed relation as by the common power means 66. That drive is preferably such that the antennas perform alternate scansion movements in their respective coordinates. A synchronized control, indicated by the dashed lines 67, which may, for example, include a relay type of control, causes switch 69 (and also other switches to be described) to operate periodically in timed relation to the scansion movements of the antennas. That relation is such that the radio frequency pulses from duplexer 58 are delivered to azimuth antenna 54 during the period of its scansion; and are delivered to elevation antenna 64 during its period of scansion. A target in the resulting beam from either antenna may return a reflected radiation pulse to that antenna, which is then transmitted via radio frequency switch 69 and duplexer 58 to the video receiver 53. A video signal is thereby produced in known manner on line 53a, mixed with other desired signals in mixer 60, and applied via line 60a to a suitable electrode of the cathode ray indicator tube 56 to modulate the intensity of its cathode ray.

The position of the cathode ray beam on the screen 57 of tube 56 may be controlled by sweep circuitry, which is indicated schematically at 63 and which develops suitable deflection currents for delivery via lines 72 to fixed deflection coils 73.

Details of sweep circuitry 63, which do not form a part of the present invention, are illustratively described in the above identified patent. Sweep circuitry 63 acts under control of periodic timing pulses received via line 59 and of antenna position signals received via line 70. The latter signals, which may typically comprise voltages proportional to the sines of the respective scansion angles, are developed for the azimuth antenna by control mechanism 55 and for the elevation antenna by control mechanism 65, and are supplied on lines 55a and 65a, respectively. One or other of those signals is selected by switch 71, which is driven via control 67 from antenna drive means 66 in timed relation to switch 69 and to the antenna scan drives. Switch 71 is so controlled that it delivers to line 70 the azimuth antenna position signal during azimuth scansion and delivers the elevation antenna position signal during elevation scansion.

Sweep circuitry 63 acts in response to those signals to produce an azimuth display 74 with zero at 75 during azimuth scansion; and to produce an elevation display 76 with zero at 77 during elevation scansion. In each display the sweep paths of the cathode ray beam are outward from the zero at an angle that corresponds at an enlarged scale to the scansion angle of the radiated beam. The two displays are limited in their extent, by means of a signal developed in sweep circuitry 63 and delivered, for example, to mixer 60 via line 80. That signal blanks the cathode ray beam at the lines 78 and 79 of the respective displays, thereby preventing them from overlapping.

With specific reference to the typical search and precision radar systems represented at 20 and 50, a primary purpose of the present invention is the provision of means acting to produce in search display 38 and in precision azimuth display 74 and elevation display 76, preferably in combination with the information normally present in those displays, visual indication of the position of one or more artificial aircraft that are readily controllable, for example manually, as to their flight in a manner closely corresponding to normal control of an actual aircraft; and that may alternatively be shifted to automatic control to carry out certain predetermined types of programmed flight.

As a basis for describing illustrative means for providing programmed flight in accordance with the present invention, it will be convenient first to describe typical means by which an artificial aircraft may be manually controlled in a realistic manner, as more fully described and claimed in the above identified patent application.

A control unit is indicated at 100, comprising separately operable devices for producing manually controllable signals that represent the respective flight characteristics selected for control of the artificial aircraft. In the present embodiment a rate-of-climb control 102 produces over line 103 an electrical signal that represents the rate of climb of the artificial aircraft and is variable by manipulation of knob 104; a speed control 105 produces over line 106 an electrical signal that represents the speed of the aircraft in the direction of its heading and that is variable by manipulation of knob 107; and a rate-of-turn control 108 produces over line 109 an electrical signal that represents the rate of change of the direction of flight of the artificial aircraft, measured in a horizontal plane, that signal being variable by manipulation of knob 110. The system as a whole acts under control of those three signals to produce search and precision video signals that are supplied via lines 162 and 192 to the respective radar systems 20 and 50 and that may be combined in mixers 30 and 60 with the respective video information of those systems to produce modulation of the intensity of the cathode ray beams in the indicator tubes of those systems. Those video signals, being produced under control of the three control signals in a manner to be described, produce on their respective indicator screens cathode ray beam indications that represent the position that an actual aircraft would have if flying under the same conditions of rate of climb, speed and rate of turn, for example, that are represented by the signals on lines 103, 106 and 109, respectively.

The rate-of-turn signal on line 109 is supplied to a course computer, indicated schematically at 112. As illustratively shown, and as will be described in illustrative form (Fig. 2), course computer 112 comprises means for driving a heading shaft 115 at a rate of revolution that is directly equal in magnitude, and corresponds in direction, to the rate of change of the course of the artificial aircraft as represented by the signal on line 109. The angular position of heading shaft 115 therefore represents directly the direction of flight or heading of an artificial aircraft flying in accordance with the signal from rate-of-turn control 108.

That course information is supplied, for example directly in terms of the shaft position, to a heading resolver, indicated schematically at 120. The speed signal on line 106 is also supplied to heading resolver 120. Heading resolver 120 may comprise any suitable mechanism that is responsive to the course signal provided by shaft 115 and to the speed signal provided over line 106, which signals together define a definite velocity; and that derives therefrom two signals that represent the same velocity in terms of its components along suitable cartesian coordinates. The resulting cartesian velocity signals, which are supplied over lines 121 and 122, respectively, may comprise, for example, electrical voltages directly proportional to components of the velocity along $x$ and $y$ coordinates that have a predetermined relationship to the direction of approach to the runway. It is ordinarily preferred to take the $x$ coordinate parallel to the runway axis and directed toward an approaching aircraft. That direction lies within the angular ranges covered by both azimuth and elevation displays of precision radar system 50.

The cartesian velocity signals, whatever their detailed nature, are supplied to respective integrating means, represented in schematic form at 125 and 126, respectively, whereby they are separately integrated with respect to time. The resulting output signals on lines 127 and 128, respectively, are proportional to the time integrals of the input signals, and represent the corresponding cartesian coordinates of the aircraft position that would result from flight at the component velocities represented by the input signals to the integrators. Those cartesian position signals may comprise, for example, electrical voltages proportional to the $x$ and $y$ coordinates of the position of the aircraft with respect to a predetermined ground zero. That ground zero may conveniently, although not necessarily, be taken at or near the position of the radar antennas of radar systems 20 and 50, which in normal practice are close together and are positioned near the touchdown point of the runway.

The control signal on line 103 from rate-of-climb control 102 may be considered to represent the component of the aircraft velocity in the vertical, or $z$, coordinate. That signal is supplied to a third integrating means, indicated at 130. Integrator 130 produces on line 131 a cartesian position signal which is proportional to the time integral of the rate-of-climb control signal on line 103, and which represents the vertical position, or height, of an aircraft flying with the rate of climb corresponding to the position of control 104. That $z$ position signal may, for example, be an electrical voltage proportional to the vertical coordinate of the position of the aircraft with respect to the ground zero.

Only the $x$ and $y$ position signals are required for production of the video signal that is supplied to search system 20, since that radar system typically provides no indication of elevation. As illustrated, the $x$ and $y$ position signals are supplied from lines 127 and 128, respectively, to a computer, which is indicated schematically at 140 and which will be referred to as the R, $\theta$ computer. The function of R, $\theta$ computer 140 is to derive from the $x$ and $y$ cartesian position signals other signals that represent the position of the artificial aircraft in terms of its azimuth angle and its radial distance with respect to the coordinate zero. That computer may be of any type capable of deriving from two cartesian position signals two corresponding polar position signals. For example, computer 140 may drive a shaft, indicated schematically at 142, under joint control of the $x$ and $y$ position signals in such a way that the shaft angle continuously represents the azimuth angle of the artificial aircraft with respect to the zero of the cartesian coordinates, the shaft position thereby constituting an azimuth position signal; and an electrical range signal may be delivered by computer 140 on line 143, representing the horizontal distance of the aircraft from that zero.

The azimuth angle signal, comprising in the present instance the position of bearing shaft 142, and the search antenna position data from line 35 of search system 20 are supplied to an angle comparison means, indicated schematically at 146, which develops an angle gate on line 147. That angle gate is typically an electrical square wave the duration of which corresponds to that portion of the scansion cycle of search antenna 24 for which the azimuth of the radiated beam substantially coincides with the azimuth represented by the position of bearing shaft 142. Under that condition it follows that the angle of sweep path 37 on indicator screen 39 correctly corresponds to the azimuth angle of the artificial aircraft.

It may be noted that when (as in the present embodiment) the azimuth angle signal at 142 and the antenna angle data at 35 comprise signals of different types, the comparison means 146 must in general include means for translating at least one signal into different terms so that it may be effectively compared with the other signal.

The range signal on line 143 is utilized to develop a range gate. That range gate is typically an electrical square wave the duration of which corresponds to that portion of each sweep 37 of the cathode ray beam that lies at a radius from zero 36 corresponding to the range represented by the instant value of the range signal. For production of such a range gate, a timing signal from timing means 21 of the search radar system is supplied via line 27b to a circuit indicated schematically at 150. That circuit develops in known manner an electric wave of sawtooth form in response to each timing signal. That sawtooth wave is supplied via line 151 to range comparison circuit 153, which circuit also receives the range signal from line 143. Circuit 153 acts under joint control of the range signal and the sawtooth wave to develop on line 154 a gate in response to a predetermined relationship between them. For example, the voltage of the sawtooth wave may increase in direct proportion to the radial movement of the cathode ray beam along sweep 37; and the range signal may be a voltage directly proportional to the instant range of the artificial aircraft. With suitable choice of the proportionality constants, equality of those two voltages signifies that the cathode ray beam is at a radius from zero 36 corresponding to the aircraft range. Under that illustrative condition, comparison circuit 153 is designed to develop a range gate in response to equality of the two input voltages. The range gate on line 154 and the angle gate on line 147 are supplied to a circuit 160, which may typically comprise a blocking oscillator, and which acts to develop on line 162 a video signal only in response to coincidence of a range gate and an angle gate. That video signal is then typically supplied by line 162 to mixer circuit 30 of search radar system 20, where it is superimposed upon the regular composite video signal of that system, and acts to intensify the cathode ray beam. Because of the described timing control of the video signal on line 162, that intensification of the beam occurs only during a sweep 37 that corresponds in angle to the azimuth angle of the artificial aircraft (as represented, for example, by the position of shaft 142); and only during the relatively small portion of that sweep that corresponds in radius to the range of the artificial aircraft (as represented, for example, by the range signal on line 143). The result is a visible indication, as typically shown at 40, on indicator screen 39 corresponding both in range and azimuth to the instant position of the artificial aircraft.

As an example of operation of the described system, it will be assumed that rate-of-turn control 108 is adjusted for zero rate of turn (that is, for flight in a straight line) and that speed control 105 is adjusted for some constant speed. Course computer 112 then holds shaft 115 in a stationary position representing the direction of flight and constituting a course signal; and a constant speed signal stands on line 106. Heading resolver 120 derives from those two constant input signals two corresponding constant output signals on lines 121 and 122, representing the respective components of the aircraft velocity along the $x$ and $y$ coordinates. Those velocity signals are separately integrated by integrators 125 and 126, producing $x$ and $y$ position signals on lines 127 and 128, respectively.

If, for example, the direction of flight represented by the position of shaft 115 is parallel to the $x$ axis, the $y$ Cartesian velocity signal on the line 122 will be zero and the corresponding $y$ position signal is therefore constant, since integration of zero leads to a constant. The constant value of the $y$ position coordinate need not itself be zero, however, but in general has a finite value depending on the preceding flight pattern of the artificial aircraft. The $x$ position signal, under the assumed flight conditions, increases or decreases uniformly with time, depending upon whether the $x$ velocity signal on line 121 represents flight away from or toward the origin of co-ordinates. Hence R, $\theta$ computer 140 receives a fixed $y$ position signal and a uniformly varying $x$ position signal. In general both the range and azimuth signals derived by computer 140 then vary non-uniformly. That variation, however, is such as to cause the representation 40 of the artificial aircraft to move across screen 39 in a straight line at a uniform velocity corresponding to the speed signal on line 106 and in a direction corresponding to the position of shaft 115. The corresponding operation of the system for other conditions of control will be understood from the preceding description.

Visual indication of the position of the artificial aircraft in the displays of precision radar system 50 can be derived from the $x$, $y$ and $z$ position signals on lines 127, 128 and 131, respectively, in a manner corresponding to that just described for deriving the search indication from the $x$ and $y$ position signals. As to the precision azimuth display 74, for example, the $x$ and $y$ position signals can be supplied to a separate R, $\theta$ computer to derive azimuth and range signals; or, indeed, the azimuth and range signals from computer 140 may be used if desired in the precision as well as in the search system. In developing a precision azimuth angle gate, for example, the azimuth signal at shaft 142 may be compared to azimuth scansion data representing the position of precision azimuth antenna 54, such data being obtainable, for example, from scansion drive 55 via line 55a. And in developing a precision range gate, the range signal on line 143 may be compared, for example, to a sawtooth wave generated in response to a timing pulse from precision timing means 51.

As to the precision elevation display, it will be understood without detailed explanation that the $x$ and $z$ position signals on lines 127 and 131 are related to the elevation display in a manner that corresponds closely to the relation of the $x$ and $y$ position signals to the azimuth display. Thus, the $x$ and $z$ position signals may be supplied to a computer of the same type as R, $\theta$ computer 140 for derivation of range and elevation signals. A range gate may then be derived from the range signal and an elevation gate derived from the elevation signal by means corresponding to those described for the azimuth coordinate. A video signal may then be derived from the two gates and mixed with the normal video that produces elevation display 76.

However, in accordance with the invention it is preferred to employ for the precision system a different type of computation, which takes advantage of the relatively restricted angular range of the precision displays and, within those limits, provides the relatively high accuracy required by the precision system with remarkable economy of instrumentation. The precision radar system is concerned primarily with aircraft actually approaching the runway along a predetermined glide path. With the $x$ axis selected parallel to the runway, such an aircraft is necessarily relatively close to the $x$ axis. Under that condition, and in fact throughout the angular range, whether in azimuth or in elevation, of the precision system, the actual range of an aircraft is very closely equal to the $x$ coordinate of its position. In accordance with the present aspect of the invention, the $x$ coordinate of the position of the artificial aircraft, derived typically as has been described, is utilized directly as the aircraft range in developing a precision video signal. It is emphasized, however, that in the preferred form of the invention derivation of the signal representing that $x$ coordinate takes account of the true course of the aircraft and does not assume that course to be parallel to the $x$ axis.

As has been indicated, a range gate for the precision radar system may be developed directly from the $x$ coordinate position signal on line 127. That signal, for example, may be supplied via line 127a to a range comparison circuit 170, which also receives via line 171 a sawtooth wave which has been generated by a circuit 172 in timed relation to a timing pulse received over line 173 from timing means 51 of the precision system. The range gate, typically a square wave, is thus produced on line 174 at a time that follows the timing signal by a definite time delay, which corresponds to the range represented by the $x$ position signal.

Azimuth and elevation position signals are developed in suitable form for comparison with the antenna position data derived from the scansion drive means 55 and 65 of the azimuth and elevation antennas. Whereas such data may be of various types, it is convenient to utilize the type that is commonly developed in existing precision systems, namely a direct current voltage proportional to the sine of the scansion angle, whether azimuth or elevation.

In accordance with the present aspect of the invention, azimuth and elevation signals for comparison with antenna data of that type are developed by means of ratio resolvers, which derive signals proportional to the quotient of the $y$ and $z$ coordinates, respectively, by the $x$ coordinate. It may be noted that such signals are directly proportional to the tangent of the angle in question. However, for small values of the angle such a signal is very nearly proportional to the sine of the angle, as well as to the angle itself.

Thus, an azimuth position signal for the precision system is preferably derived by a ratio resolver, indicated schematically at 176, which is supplied with the $x$ and $y$ position signals from lines 127 and 128, respectively, and which derives a voltage signal that is proportional to the quotient of the $y$ coordinate by the $x$ coordinate, the resulting signal being produced on line 178 and being utilized as a representation of the azimuth angle $\theta$ of the artificial aircraft. Similarly, an elevation ratio resolver 180 is supplied with the $x$ position signal from line 127 and with the $z$ position signal from line 131, and produces on line 182 a signal proportional to the quotient of the $z$ coordinate by the $x$ coordinate, the latter signal being proportional to the tangent of the elevation position angle $\phi$ of the artificial aircraft, and representing that angle.

The antenna position data from lines 55a and 65a might be obtained directly via switch 71 from line 70, which receives such azimuth data during scansion in azimuth and such elevation data during scansion in elevation. Such data of alternating type from line 70 might be compared, for example, with a position angle signal taken alternately from lines 178 and 182 by a synchronously operated double throw switch. In the present illustrative embodiment, however, the two angle signals are independently combined by adders 184 and 185 with the respective antenna angle data supplied from lines 55a and 65a, respectively, and the resulting signal combinations on lines 188 and 189, respectively, are supplied alternately to the discriminating circuit indicated at 186 via the switch 187. That switch is actuated as by driving means 67 synchronously with switches 69 and 71 in such phase that circuit 186 receives an azimuth signal from adder 184 during scansion in azimuth and receives an elevation signal from adder 185 during scansion in elevation. The outputs from each of the adders 184 and 185 are typically voltages that have a definite predetermined value when the aircraft position angle and the antenna position angle represented by the two input signals are equal. For example, taking the azimuth case for illustration, the azimuth antenna data on line 55a may comprise a voltage having a definite functional relation to the azimuth angle of the antenna, and the azimuth position signal on line 178 may comprise a voltage having, as to magnitude, the same functional relation to the azimuth position of the aircraft, but being of opposite polarity. If those two signals are then added algebraically by adder 184, the combined signal on line 188 necessarily has the definite value zero whenever the antenna azimuth angle is equal to the aircraft azimuth position. Under that illustrative condition, discriminating circuit 186 is so arranged as to produce on line 191 an angle gate in response to zero input voltage on the line from switch 187. The single discriminating circuit 186 is thus sufficient to perform alternately the two functions of producing an azimuth angle gate on line 191 in response to a definite relation (typically equality) of the azimuth position signal from line 178 and the azimuth antenna data from line 55a; and producing an elevation angle gate on the same line 191 in response to a predetermined relation (typically equality) between the elevation position signal from line 182 and the elevation antenna data from line 65a.

The range gate on line 174 and the azimuth and elevation angle gates on line 191 are supplied to a circuit indicated at 190, which may typically comprise a blocking oscillator, and which produces on line 192 a precision video signal only in response to coincidence of a range and an angle gate. That video signal is supplied from line 192 to precision video mixer 60, where it is preferably combined with the normal video signal of the precision system. It will be seen, from the described synchronized operation of switches 69, 71 and 187, that the video signal on line 192 represents azimuth and range of the artificial aircraft during production of azimuth display 74; and represents elevation and range of the artificial aircraft during production of elevation display 76. Accordingly, that video signal produces in the respective displays visual indications, typically shown at 198 and 194, respectively, which correctly represent the aircraft position in the proper coordinates of each display.

In accordance with the present invention, control of such an aircraft simulator system as has been illustratively described may be transferred from manual control 100 to control means capable of providing a desired type of automatic control and indicated schematically and in illustrative form in Fig. 1 at 200. Such automatic control may be provided for any one or more of the control variables by which flight of the artificial aircraft is normally controlled, shown typically as rate-of-climb, speed and rate-of-turn. Additionally or alternatively, such automatic control may be applied directly to one or more of the variables derived from those control variables. For example, the input signal to heading resolver 120 may be shifted selectively among different types of control. That input signal is shown as the position of heading shaft 115, which, for manual control is driven via course computer 112 in accordance with the setting of manual rate-of-turn control 108. Any suitable type of mechanical or electrical switching means may be employed for switching that control, electrical switching being illustratively shown alone in Figs. 1 and 2 and in combination with mechanical switching in Figs. 1A and 5.

As shown in Fig. 1 the input signal on line 109b to course computer 112 is received via the multi-position switch 202. In switch position 1, as shown, that signal is received from rate-of-turn control 108 via line 109, providing the manual control already described. By shifting switch 202 to one of its other positions, indicated typically as 2 and 3, the input to the course computer is received from control means 200 via a selected one of its output lines 209a, and 209b. Each of those lines may provide a distinct type of control, depending upon the detailed structure of control means 200. Any required number of such lines may be provided, corresponding to the types of control required.

In accordance with the invention, input signals to control means 200 may be of several different types, the particular signals provided depending upon the types of flight pattern that may be required and the type of instrumentation selected for providing them. As illustrated, those input signals include signals already present in the simulator system as described above; additional signals that are developed from such simulator signals; and external signals that may be developed independently of the simulator system. A typical input signal of the latter type is a timing signal, which may be developed by suitable timing means represented at 212, and supplied to control means 200 via line 213. Typical control signals taken directly from the simulator system may include, for example, a range signal taken via line 215 from line 143 of the simulator system, a signal representing the y coordinate of the artificial aircraft, taken via line 216 from line 128; an angle signal representing the bearing of the aircraft from the ground zero, which may be obtained by any suitable type of connection 217 from shaft 142; and an angle signal representing the instant course of the aircraft, obtainable via a connection 218 from shaft 115. Connections 217 and 218 are represented by dashed lines in Fig. 1, to emphasize that they may comprise mechanical means such as shafts, but it will be understood that rotational positions can be indicated alternatively by electrical means, if preferred, and that signals of mechanical type may be substituted for those described typically as being of an electrical nature.

As an illustration of the types of control signal that may be developed especially for supply to control means 200, means are indicated in Fig. 1 for developing from the signals already available in the simulator system special signals that represent the range and bearing of the artificial aircraft with respect to a program zero different from the regular ground zero of the system. As typically shown, x and y Cartesian coordinate signals from the simulator system are supplied via lines 220 and 221 to variable offset means 222 and 223, respectively, which develop signals representing Cartesian coordinates of the aircraft with respect to the program zero. Those shifted Cartesian coordinate signals are then supplied via lines 224 and 225, respectively, to computing means of any suitable type, represented at 226, acting to develop signals representing the polar coordinates that correspond to the shifted Cartesian coordinates. Those shifted polar coordinates, which will be indicated by $R'$ and $\theta'$, are then the range and bearing respectively, of the aircraft with respect to the selected program zero. $R'$, $\theta'$ computer 226 may be of any suitable type, and is typically substantially a duplicate of $R$, $\theta$ computer 140. An illustrative detailed embodiment of $R$, $\theta$ computer has been described in my above identified copending application, and is represented in Fig. 3 thereof. Typical circuitry for offset means 222 and 223 is described below in connection with Fig. 5 of the present specification.

As indicated in Fig. 1, the $R'$ signal developed by $R'$, $\theta'$ computer 226 may typically be an electrical signal supplied to control means 200 via line 228, and the $\theta'$ signal may typically comprise the rotational position of a bearing shaft 229, which signal is mechanically supplied to control means 200. For some purposes it may be useful to consider the two offset means 222 and 223 and $R'$, $\theta'$ computer 226 as comprising a part of the automatic control means 200.

Each of the output rate-of-turn signals supplied from control means 200 via the several lines 209 may be developed from one or more input signals such as have been described, or from such signals in combination with means for manual selection and adjustment. In Fig. 1 the knob 230 represents means for carrying out such manual control or adjustment of the performance of automatic control means 200.

In Fig. 1A is represented a further illustrative type of automatic control, whereby a clutch mechanism is provided in the connection between course computer 112 and heading resolver 120, as indicated at 235. For example, input shaft 116a to heading resolver 120 may be connected via clutch 235 alternatively to output shaft 116 from course computer 112, and driven in the manner already described, or may be connected instead to an output shaft 236 from control means 200a. That control means may be provided with suitable input signals, such as have already been described in connection with Fig. 1. Such input connections are typically represented in Fig. 1A at 213, 215, 216, 217, 228 and 229, and may also include a connection 218 from heading shaft 116a. Control means 200a then acts in accordance with the invention to drive its output shaft, or otherwise produce an output signal for control of heading shaft 116a, in response to the several input signals in any desired predetermined manner. Control means 200a, may, for example, include means for producing a rate-of-turn signal such as is produced on lines 209 in Fig. 1 and a course computer similar to computer 112 of Fig. 1 for driving output shaft 236. In actual practice, a single embodiment of the invention may include both mechanical switching, typified by clutch 235 of Fig. 1A, and electrical switching, typified by switch 202 of Fig. 1. Moreover, such switching may be provided for controlling any required number of variables, the control of heading shaft 116a in Fig. 1A and of the rate-of-turn signal in Fig. 1 being illustrative.

Figs. 2 and 5, taken together, show an illustrative system embodying a typical plurality of control functions. The portion of that system shown in Fig. 2 is adapted to produce movements of the artificial aircraft that correspond to substantially random flight of an aircraft across the area represented by the display. Such random flight in the present embodiment may comprise flight paths originating at random points of the boundary of the display and randomly directed, and changes of course of an apparently random nature may be provided during such flights. Fig. 2 also includes illustrative means for controlling flight of an aircraft that has left the area of the display and for returning it to the display either substantially at the point at which it left or at a point spaced therefrom. Fig. 2 further shows illustrative circuitry suitable for carrying out the described functions of course computer 112 and heading resolver 120.

As shown, the rate-of-turn signal supplied on line 109b to course computer 112 is a direct current voltage of which the magnitude and polarity represent the rate and the direction, respectively, at which the artificial aircraft is to change its course. For manual control of the artificial aircraft, such a signal is developed at the movable contact of a potentiometer 250, connected in series with resistances 251 and 252 between positive and negative voltage sources and driven by control knob 110. A grounded center tap 254 on potentiometer 250 may define a position coresponding to zero rate-of-turn, or straight aircraft flight. The rate-of-turn signal on line 109 is supplied to input line 109b of course computer 112 via deck a of control switch 430 when in position 1. That switch corresponds to switch 202 of Fig. 1. The functions of decks b and c of switch 430 pertain to the portion of the system shown in Fig. 5. The function of deck d will be described below.

In course computer 112, as illustratively shown, the input signal from line 109b is compared, as by a chopper switch 260, with a voltage developed on line 261 by a direct current generator 262, driven by a servo motor 264. The difference voltage from chopper switch 260 is supplied via line 265 to a servo amplifier 266, which drives motor 264 at a speed and in a direction to maintain the output of generator 262 substantially equal to the rate-of-turn signal on line 109b. Heading shaft 115 is driven by motor 264 via a speed reduction gear 267, the mechanism being so proportioned that shaft 115 is driven at a speed corresponding to the position of manual control knob 110.

Heading resolver 120 may typically comprise a sine potentiometer, indicated schematically at 270, supplied via lines 271a and 271b with equal positive and negative direct current voltages proportional to the speed of the artificial aircraft. Such speed signal voltages may be developed on lines 106a and 106b by speed control 105, which may comprise two potentiometers connected between ground and respective positive and negative voltage sources and controlled in gang by manual knob 107. As shown, lines 106a and 106b are connected to lines 271a and 271b, respectively, via the normally closed switch contacts of a relay 274, actuation of which shifts control of the speed signals from manual speed control 105 to any other desired source. As shown, relay actuation produces zero speed signals by grounding both lines 271a and 271b. An illustrative function of relay 274 will be described. The output from sine potentiometer 270 is taken from the cosine brush 272 to line 121 and from sine brush 273 to line 122, those outputs representing the x and y components, respectively, of the aircraft velocity.

In accordance with the invention, shifting of switch 430 from position 1 to position 2 transfers control of the rate-of-turn signal on line 109b from manual control to automatic control by program control means 200, and at the same time subjects the speed signal on lines 271a and 271b to control by the same means 200. In position 2 of switch 430, line 109b is connected via the line 280, the normally closed contact of relay switch 282, the line 284 and the normally closed contact of relay 286, to ground. Hence, with both relays idle, zero rate-of-turn signal is supplied to course computer 112, which therefore maintains heading shaft 115 stationary, corresponding to straight line flight of the artificial aircraft.

Control means 200 includes means for intermittently lifting ground from line 109b and substituting a turn signal, that action being performed in such a way as to give the appearance of randomness. For some purposes it is sufficient that either the duration or the magnitude of that turn signal be variable in a substantially random manner, but such variation of both duration and magnitude is preferred, and is illustratively shown in Fig. 2. A rate-of-turn signal of varying magnitude is produced on the line 290, which will be designated the random flight bus. That control signal may be produced, if desired, by relatively complex means that provide more or less strictly random variations in its magnitude. However, it is found sufficient for most purposes to develop a control signal in the relatively simple manner to be described. A continuously rotatable potentiometer 300, preferably a sine potentiometer, is connected across a suitable source of electrical power, the nature of that power being appropriate to the type of input signal required at 109b to operate course computer 112. That power source in the present instance may comprise positive and negative direct current voltages, series resistances 302 and 303 being preferably provided. Potentiometer 300 is driven mechanically by suitable power means, indicated as the motor 305 and gear reduction 306, at a relatively low rate of rotation, for example at a rate within the range from 1/10 to 1 revolution per minute. The amplitude of the signal obtained at the potentiometer brush 308 then varies sinusoidally with corresponding frequency. That signal is supplied to random flight bus 290, which may serve a plurality of aircraft channels in the simulator system. By connecting line 109b to the random flight bus at a series of times selected arbitrarily at intervals that are long compared to the period of potentiometer 300 but not integrally related to it, a signal is obtained the amplitude of which varies from one such connection to the next in a manner that is effectively random. And by maintaining each connection for a time that is short compared to the potentiometer period, the amplitude of the signal may be made effectively constant during each connection.

Means for producing such intermittent connections between line 109b and random flight bus 290 are shown illustratively as comprising the double throw relay switch 286 and the commutator 310. The relay coil is connected between ground and a brush 312 that engages commutator 310. The commutator surface comprises a number of conductive portions 314 separated by insulative portions 315, the length of the portions of both types being preferably non-uniform and irregularly arranged. The body and conductive portions of the commutator are connected at 316 to a voltage source suitable for energizing the relay coil. Commutator 310 is preferably driven at a speed that is not integrally related to that of potentiometer 300. For example, a speed changing device 320, preferably of belt drive, may be inserted in the drive connection between motor 305 and commutator 310. One or more additional brushes may be provided at irregularly spaced points about commutator 310, a typical such brush being indicated at 322 with suitable connection, as via the line 324, to actuate corresponding relays in other channels.

With potentiometer 300 and commutator 310 continuously driven as described, relay 286 is intermittently actuated at apparently irregular times and for varying periods, supplying to course computer 112 via control switch 430 whatever turn signal happens to be standing on random flight bus 290. Thus, during the irregular periods just described, the course computer is supplied with signals that are effectively random in amplitude, and that produce apparently random changes in course of the controlled artificial aircraft. With several artificial aircraft controlled through their respective channels in a similar manner, a remarkably realistic simulation of normal air traffic is obtainable.

It is desirable to provide, in connection with a random flight program control, means for automatically handling the artificial aircraft whenever it passes beyond the boundaries of the display. As an example, the boundaries of the search display 38 (Fig. 1), which has circular symmetry about the ground zero, may be defined by a definite value, say $R_0$, of the aircraft range R. Whenever R exceeds $R_0$, the artificial aircraft is outside the search display. In accordance with the invention as illustratively shown in Fig. 2, means are provided that respond to the criterion, R is greater than $R_0$, to transfer control of the aircraft from the random flight bus to a special control that acts to turn the aircraft to a heading that will take it back into the area of the display.

The range signal developed on line 143 by R, $\theta$ computer 140 is supplied via line 215 to a range actuator, indicated schematically at 340. A range comparison signal, representing a range $R_0$ somewhat larger than the maximum range covered by the search display, is developed in any suitable manner, as by a potentiometer 342, and is supplied via line 344 to the range actuator. The latter comprises any suitable means, such as a differential amplifier, for comparing the input signals from lines 215 and 344 and generating a control signal on line 341 only when the range R exceeds $R_0$. That signal may be utilized in any desired manner to effectively reverse the direction of flight of the artificial aircraft. Such reversal of direction would result, for example, from interchange of the polarity of the speed signals supplied via lines 271a and 271b to heading resolver 120. Such interchange might be produced by suitable connection of relay 274, for example. In the system illustrated, however, course computer 112 is employed to fly the aircraft around. That is typically accomplished under control of range actuator 340 by actuation of relay 282, already mentioned. Actuation of relay 282 isolates line 280 from the random flight bus, and connects it instead via line 346 to a rate-of-turn signal of suitable type. Such a signal may, for example, be developed by a potentiometer 347, connected between ground and a source of positive voltage. Adjustment of that potentiometer then permits manual variation of the rate at which the aircraft changes course.

Many types of control may be provided for limiting the period of actuation of relay 282 to a suitable time, such as will cause the aircraft to fly back into the area of display. That may be done, for example, by introducing between line 341 and the relay coil a time delay mechanism of known type that opens the circuit after a settable time delay, and later closes the circuit in preparation for another cycle. Ordinarily, however, it is preferred to measure the period of relay actuation directly in terms of the relation between the actual and the desired heading.

For that purpose, many different types of angle-comparing means may be used, an illustrative device being represented somewhat schematically at 350. Comparator 350 comprises two members relatively rotatable about a common axis under control of the two angles to be compared, and switch means responsive to the relative positions of the members. As shown, a metal disk 352 is mounted on a shaft 353 and carries a sector 354 of insulating material set into one face. Shaft 353 is driven, as by the connection indicated at 218, in direct correspondence with heading shaft 115, and its angle therefore represents the aircraft heading. A second shaft 356, coaxial with 353, carries a brush 357 and is driven, as by the connection indicated at 217, in direct correspondence with bearing shaft 142, and therefore represents the aircraft bearing $\theta$ from the ground zero. Brush 357 engages the face of disk 352 and makes electrical contact with it except when the two shafts 353 and 356 are so related that the brush rides on insulating sector 354, when that contact is opened. The relations are such that open condition of switch 350 represents an aircraft course generally toward the ground zero. Connections to the respective rotary elements may be made via brushes indicated at 358 and 359, which continuously contact shafts 353 and 356, respectively. The device described then acts as an angle-responsive switch between brushes 358 and 359. That switch is inserted in series with line 341, the coil of relay 282 and ground.

Whenever its random flight carries the artificial aircraft beyond the area of the search display, causing R to exceed $R_0$, range actuator 340 supplies to line 341 a voltage signal which is normally transmitted via switch 350 to actuate relay 282. A turn signal is thereby supplied from potentiometer 347 to course computer 115 regardless of the condition of the random flight control circuitry proper. That turn signal is maintained until the aircraft is again headed back toward the area of the display, as determined by angle-responsive switch 350. Relay 282 is then returned to idle condition, returning control of the aircraft to the random flight bus. As soon as the aircraft range R has decrease to less than $R_0$, range actuator 340 effectively opens line 341, rendering relay 282 independent of the condition of switch 350.

If desired, the range control just described can be arranged to modify the speed of the aircraft, either instead of or in addition to the rate-of-turn. As shown, the coil of relay 274, already described, is connected in parallel with that of relay 282 between ground and brush 358 of switch 350. That connection is provided via lines 360 and 362, which are preferably so connected at deck d of control switch 430 that relay 274 can be actuated only when that switch is in position 2 for random flight. Actuation of relay 274 removes control of the aircraft speed from manual speed control 105, and supplies to heading resolver 120 speed signals from another source, as desired. That source is shown illustratively as ground, and causes forward movement of the aircraft to be arrested during the turning operation that has been described. Alternatively, the speed might be shifted to any other desired value. For example, by providing a larger speed than normal during the turning operation, the aircraft may be made to reappear in the display at a point relatively widely spaced from that at which it left. When the speed is shifted, during turning, to a low value, or to zero as shown, relay 282 may be omitted entirely, if desired, the random changes of course provided by the described random flight circuitry being relied upon to turn the aircraft heading toward the display, thereby opening switch 350, releasing relay 274 and causing the aircraft to resume flight at normal speed.

Fig. 5 represents a portion of the illustrative control system that is adapted to produce, in response to one manual command, realistic homing flight of the aircraft from its instant position to a predetermined circular holding pattern (Fig. 3); and, in response to another manual command, flight from that holding pattern to a normal approach course to the landing strip (Fig. 4). As shown, the signal for homing and holding flight is given by shifting switch 430 from position 1 or 2 to position 3. In position 3 of switch 430, the input on line 109b to course computer 112 is received via switch deck a from line 432 rather than from rate-of-turn control 108; switch deck b lifts ground from line 434, transferring control of servo 550, to be described, to relay V; and switch deck c supplies a positive voltage to line 436, energizing mechanism 480, to be described. Switch deck d merely opens the actuating circuit for relay 274 of Fig. 2, maintaining the speed signal under manual control.

The signal for transition from the holding pattern to the glide path is given by shifting switch 440 from position 1 to position 2, switch 430 being retained at position 3. Line 442 is thereby connected to a voltage source, causing relay II to be energized upon closure of the cam switch 600.

In Fig. 3 a typical holding pattern is represented as the circle 400, with its center at a program zero 0', adjustably offset from the ground zero 0. The ground zero is taken as the origin for the cartesian coordinates $x$ and $y$, and the coordinates of program zero 0' are represented by $x'$ and $y'$. The location of that program zero may be adjustable within wide limits without other change in the system; and a system of the type to be described may be arranged to accommodate substantially any program zero location. The points A and B in Fig. 3 represent typical arbitrary aircraft positions outside and inside, respectively, the circular holding pattern 400; and the arrows 403 and 404 represent corresponding typical aircraft headings at the time control is transferred to the program flight system to be described. That system then causes an aircraft at an outer position such as A to turn at a pre-set rate toward program zero 0', as indicated at 405; then to fly substantially radially, as indicated at 406, to the vicinity of holding pattern 400; and then make a smooth transition to the holding pattern, as indicated at 407. Similarly, an aircraft initially at an inner position such as B is caused to fly outward from program zero 0' in a generally radial direction, as indicated at 410; and to make a smooth transition, as at 411, from that course to the holding pattern. In both instances, the system may be pre-set to cause execution of the holding pattern either counter-clockwise, as shown, or clockwise. It will be understood from the illustrative system to be described that the holding pattern itself need not necessarily be circular. But circular holding patterns have been found to be sufficiently realistic for most purposes, and can be produced with relatively simple and economical instrumentation. A holding pattern such as 400 may be maintained automatically as long as desired, and the aircraft may then at any time be returned to manual control, or may be shifted to another type of automatic control, such, for example, as the random flight control already described.

Alternatively, the system of Fig. 5 permits the aircraft to be brought automatically, in response to a control signal, from the holding pattern to a normal approach to the landing strip. Such an approach is typically represented in Fig. 4. A landing strip is indicated at 415, with its longitudinal axis 416 parallel to the $x$ axis and offset therefrom by a distance $y_2$ in the positive $y$ direction. In the preferred embodiment of Fig. 5, a manual signal may be made at any time for transition from the holding pattern to the landing pattern. The aircraft then continues to execute the holding pattern until its bearing $\theta'$ from program zero 0' has a predetermined value such as $\theta'_1$. The aircraft is then caused to fly along a straight path, as indicated at 420, until the $y$ coordinate of the aircraft exceeds a predetermined value, such as $y_1$; and to execute a turn 421 at predetermined rate-of-turn into the glide path 422 along landing strip axis 416.

In a simulator system for training GCA operators, for example, several aircraft may be held automatically in respective holding patterns by program control systems of the type to be described; and an individual aircraft may be selected at the will of the instructor and brought from its holding pattern to glide path 422 in response to a single signal.

In the pattern control system of Fig. 5, control is imposed upon the simulator system between course computer 112 and heading resolver 120, heading shaft 115 being typically broken at two points for that purpose. Output shaft 115a from course computer 112 is connected via a clutch 450 to an intermediate shaft 115b. That shaft is connected via a differential mechanism 460 to the shaft 115c, which acts as input shaft to heading resolver 120. Clutch 450, which will be referred to for convenience as the heading clutch, may be of any suitable type, for example an electrically controlled magnetic clutch that closes when a voltage is applied and releases in response to open circuit. Differential 460 may be of any convenient type, and is shown somewhat schematically as a mechanical differential with equal bevel gears 461 and 462 rigidly mounted on shafts 115b and 115c, respectively. Those gears are engaged by the bevel pinions 463 which are freely pivoted on radial axes on the ring gear 464. The latter is journaled coaxially of shafts 115b and 115c and is driven as by a pinion 465 rigidly mounted on a differential drive shaft 466. In normal position of the latter shaft, shafts 115b and 115c have a definite rotational relation, which relation is maintained as shaft 115c is driven by shaft 115b. The fact that such drive through the differential involves a reversal of direction may be taken into account, for example, by measuring the position angles S and T of shafts 115b and 115c, respectively, in opposite directions; or a compensating reversing gear may be considered to be inserted between shafts 115b and 115c in series with the differential. For present purposes, forward rotation of each shaft will be taken as the direction corresponding to a left hand turn by the artificial aircraft, that is, a counter-clockwise turn as seen in Fig. 3 or 4. Angles S and T are so measured that $S=T$ in normal position of the differential. Rotation of differential driving shaft 466 from its normal position in one direction, which will be called forward, causes heading shaft 115c to advance relative to shaft 115b by a differential heading angle $\Delta T$, causing the aircraft heading to deviate counter-clockwise from the direction that would correspond to angle S of shaft 115b. Negative rotation of shaft 466 from its normal position similarly causes heading shaft 115c to lag behind intermediate shaft 115b. The differential angle $\Delta T = T - S$ between those shafts is controlled solely by differential driving shaft 466, independently of whether shaft 115b is stationary; is driven by shaft 115a, heading clutch 450 being closed; or is driven by other means to be described, heading clutch 450 being open.

Heading resolver 120 acts as already described to produce on lines 121 and 122 signals representing $x$ and $y$ components of the aircraft velocity. From those signals further variables may be derived, for example in the manner already described, for producing a cathode ray tube display of the position of the artificial aircraft; and further signals may be developed for supply to the program control system. The present program control system requires, in particular, a y position signal representing the y coordinate of the aircraft, typically developed on line 128 of the regular simulator system; and an R′ signal and a θ′ signal, representing the range and bearing, respectively, of the aircraft with respect to the offset program zero 0′. As already indicated in connection with Fig. 1, such range and bearing signals are typically developed on line 228 and shaft 229, respectively, by R′, θ′ computer 226 from input signals that are received by that computer on lines 224 and 225 and that represent, respectively, the offset cartesian coordinates x′ and y′ of the aircraft with respect to the program zero.

Fig. 5 shows at 222 and 223 illustrative adjustable offset means for developing the x′ and y′ signals from the x and y signals of the regular system, as indicated in block form in Fig. 1. Only the x offset means need be described in detail. Two voltage regulating neon tubes 252 and 253 are connected in series, with their positive and negative terminals supplied via the respective resistances 254 and 255 from suitable sources of positive and negative voltage. The total voltage drop across the resistances is preferably considerably larger than that across the tubes. The x position signal is supplied from line 220 to the junction between the two tubes, and the offset x′ position signal on output line 224a is taken from the brush of the potentiometer 256, of which the winding is connected in shunt to the tubes. By suitable adjustment of potentiometer 256, the x′ signal may be caused to differ from the x signal by any desired positive or negative offset voltage from zero up to the constant voltage drops across the respective neon tubes, the value of that offset voltage remaining substantially constant as the input x signal varies. All of that offset circuitry may be duplicated, as indicated at 223, for deriving a y′ signal.

The switch 258 permits input line 224 to R′, θ′ computer 226 to be connected alternatively to line 224a to supply an offset x′ signal via offset means 222, as shown, or to line 220 to supply the regular unshifted x signal, corresponding connections being provided for the y′ signal. In the latter position of switch 258, program zero 0′ coincides with ground zero 0 (Figs. 3 and 4).

In accordance with the invention, means are provided for driving intermediate shaft 115b in response to the θ′ signal. As illustratively shown θ′ shaft 229 is connectible by closure of a clutch 470 to a stub shaft 471 which carries a gear 472 engaging an equal gear 473 fixed on shaft 115b. Clutch 470, which will be referred to as the bearing clutch, may be of any suitable type, and is shown typically as a magnetic clutch similar to heading clutch 450. The two clutches are so controlled that when one is engaged the other is released. As shown, a double throw switch a of relay I supplies a suitable voltage via line 474 to heading clutch 450 when the relay is idle, and via line 475 to bearing clutch 470 when the relay is actuated. Thus, actuation of relay I transfers control of heading shaft 115c from course computer output shaft 115a to θ′ shaft 229. Both types of control are subject to modification by the action of differential 460. Clutches 450 and 470 are illustrative of many known types of mechanism for driving shaft 115b alternatively in accordance with the heading signal produced by course computer or in accordance with the bearing signal produced by R′, θ′ computer 226. They correspond to clutch means 235 of Fig. 1A.

When heading clutch 450 has been released and is to be engaged, the relative angular relation of shafts 115a and 115b is immaterial, since the rate-of-turn signal carried by shaft 115a consists of its rate of rotation and is independent of its position. Shaft 229, on the other hand, represents by its position the bearing θ′ of the aircraft with respect to the program zero 0′. Therefore, before engaging bearing clutch 470 it is necessary to establish the correct rotary alignment of the two clutch members, that is, of shaft 229 and of stub shaft 471 which is permanently geared at 1:1 ratio to intermediate shaft 115b. The preferred type of rotary alignment is such that heading shaft 115c represents a heading angle T at right angles to the bearing angle θ′ represented by shaft 229, differential 460 being assumed in normal position. As will become clear, if T is displaced 90° counter-clockwise from θ′, the holding pattern is executed counter-clockwise (as illustrated in Figs. 3 and 4), while clockwise displacement of T with respect to θ′ leads to clockwise execution of the holding pattern.

The required angular alignment of shafts 229 and 115b may be obtained in many different ways, either automatically or with a greater or less degree of manual control. The illustrative mechanism of Fig. 5 for producing such alignment is indicated generally by the numeral 480 and comprises means for driving shaft 115b via heading clutch 450 from course computer 112, a suitable rate-of-turn signal being supplied to that computer for the purpose, and means for energizing relay I to engage bearing clutch 470 and to release heading clutch 450 in response to attainment of the desired shaft relationship.

Mechanism 480, as illustratively shown in somewhat schematic form, comprises a commutator 482 rigidly mounted on bearing shaft 229, as indicated by the set screw 483; and a brush assembly 490, which is rotatably mounted on shaft 229 and is driven in 1:1 relation to intermediate shaft 115b independently of bearing clutch 470. As shown, brush assembly 490 is geared to the jack shaft 491 by the spur gears 492 and 493, that shaft being driven from shaft 115b by the bevel gears 494 and 495. Brush assembly 490 comprises a radial arm 496 of insulating material carrying inner and outer brushes 497 and 498, adapted to engage the flat commutator face, and electrically connected as via slip rings to respective resilient contacts 499 and 500. Contact 499 is connected via line 502, the normally closed contact of switch b of relay I, line 503 and the normally closed contact of switch b of relay II, to line 432. The latter line, as already described, supplies a rate-of-turn signal to course computer 112. Hence, in idle condition of relays I and II, that signal is derived by brush 497 from commutator 482. Brush 498 is connected via contact 500, line 505, the normally closed contact of switch a of relay II, line 506, and the coil of relay I to ground. Hence, in idle condition of relay II, voltage application to brush 500 by commutator 482 actuates relay I.

Commutator 482 is provided with two mutually insulated conductive inner sectors 485 and 486, adapted to engage brush 497, and each extending through substantially 180°; and a single outer conductive sector 487, adapted to engage brush 498 and limited to a small angle midway between sectors 485 and 486. The angular position of sector 487 is such that it is engaged by brush 498 when shafts 229 and 115b are in proper angular relation. Sector 487 may conveniently be connected to one of the inner sectors, shown as 485. A positive voltage is supplied to sectors 485 and 487, as via the slip ring 488, from line 436, already mentioned; and a negative voltage is supplied to sector 486, as via the slip ring 489 and line 437, from any suitable source. Line 437 may pass through an additional arm of switch 430, like line 436, if so desired.

Operation of the illustrative shaft alignment means just described is typically as follows. When the main control switch 430 is shifted to position 3, line 436 is energized. Since switch 440 remains at position 1, relay II remains idle. If shafts 115b and 229 are oriented, for example, as shown in Fig. 5, outer brush 498 engages the dielectric body of commutator 482, opening the circuit through the coil of relay I and idling that relay. Switch *a* of that relay causes heading clutch 450 to engage and bearing clutch 470 to release; and switch *b* connects lines 502 and 503. Inner brush 497 engages commutator sector 485, supplying a positive signal via idle relays I and II to coures computer 112. In response to that signal, output shaft 115*a* from the course computer is driven at a rate corresponding to the magnitude of the signal and in a direction corresponding to the polarity of the signal. The latter correspondence is such as to drive shaft 115*b* via closed clutch 450 in a direction toward alignment with $\theta'$ shaft 229. If the initial shaft positions cause inner brush 497 to engage negative sector 486, shaft 115*b* is driven in the opposite direction, also tending to produce correct alignment with shaft 229. In either case, shaft 115*b* continues to be driven until correct alignment occurs.

Outer brush 498 then engages commutator sector 487, energizing relay I. If the shafts happen to be correctly aligned when main switch 430 is shifted to position 3, such relay actuation occurs at once. Upon actuation of relay I, relay switch *b* opens the signal circuit to course computer 112, and relay switch *a* releases clutch 450 and engages clutch 470. The latter clutch completes a mechanical connection between commutator 482 and brush assembly 490 which causes them to turn in unison, maintaining contact of outer brush 498 and sector 487, and thereby holding relay I. Such mechanical holding action may be replaced or supplemented by an electrical holding circuit, preferably including in series a normally closed switch of relay II. With relay I actuated, shaft 115*b* is directly driven by shaft 229, the position of which continuously represents the bearing angle $\theta'$ of the aircraft from the program zero 0'. That angle is transmitted by shaft 115*b* to heading shaft 115*c* after modification by differential 460.

Any suitable type of control may be employed for producing that type of differential action. The preferred servo control represented in Fig. 5 at 550 is illustrative. A servo motor 552 drives differential shaft 466 in accordance with the output from the servo amplifier 553. Motor 552 also drives the brush of a potentiometer 555, as indicated by the broken line 556. The winding of potentiometer 555 is connected in series with suitable voltage dividing resistances 558 and 559 between positive and negative sources of potential. The voltage tapped on line 560 by the potentiometer brush is compared, as by a chopper switch 562, with a reference voltage which is supplied over line 563 and which represents the value of $R'-r_2$. The resulting difference voltage is supplied via line 564 as input error signal to servo amplifier 553. The servo system thus acts to maintain the voltage tapped from potentiometer 555 equal to the signal supplied on line 563, driving differential 460 in direct correspondence to the potentiometer brush movement. Positive stops are preferably provided at such points in the system as to limit differential movement to a definite range on each side of normal position, preferably corresponding to $\Delta T = \pm 90°$. Such stops are indicated schematically at 567 and 568 at opposite ends of potentiometer 555.

The input reference signal on line 563 to servo system 550 may be developed in any suitable manner. As shown, it is developed as the sum of a voltage directly proportional to $R'$, supplied from $R'$, $\theta'$ computer 226 via a circuit that includes line 228, the normally closed contact of switch *a* of a relay V and adding resistance 570; and a voltage directly proportional to the negative of $r_2$, supplied from a potentiometer 573 via the normally closed contact of switch *b* of relay V and adding resistance 571. Potentiometer 573 has its winding connected between ground and a source of negative voltage, and is adjustable manually to vary the radius $r_2$ of holding circle 400 (Figs. 3 and 4).

If the resulting signal on line 563 has a positive or negative value greater than can be matched on the portion of potentiometer 555 that is available between stops 567 and 568, the potentiometer is driven against one of those stops. The differential angle $\Delta T$ is thereby maintained at the definite angle $+90°$ or $-90°$ as the case may be. As $R'$ aproaches $r_2$, whether from above or from below, the potentiometer remains against the stop until the voltage $R'-r_2$ reaches the voltage at the potentiometer brush, which value may be different for the two stops. The brush then moves away from the stop, shifting differential 460 progressively toward its normal position. That normal position, for which $\Delta T = 0$, is reached when $R' = r_2$. Any desired functional relation between $\Delta T$ and $R'-r_2$ may be obtained by corresponding functional winding of potentiometer 555.

When the described program control is not in use it is desirable to maintain differential 460 in some definite position, preferably that referred to as its normal position. That may be accomplished, for example, by applying a zero reference signal to line 563, as via line 434 and switch arm *b* of main control switch 430, already described, which acts to ground line 563 unless switch 430 is in position 3.

With the illustrative differential control described, differential operation during homing and holding flight is typically as follows. When main switch 430 is shifted to position 3, ground is lifted from line 434 and servo 550 immediately receives a reference signal on line 563 representing the value of $R'-r_2$. If $R'$ is such that that value is not zero, the servo drives differential 460 one way or the other from its normal position, causing difference angle $\Delta T = T - S$ between shafts 115*b* and 115*c* to become either positive or negative, depending upon the sign of $R'-r_2$. If the aircraft range $R'$ is much greater than $r_2$, for example, as at A of Fig. 3, $\Delta T$ becomes positive and soon reaches 90°, at which it is held by stop 567. That action causes the aircraft heading T to shift progressively counter-clockwise from the direction that corresponds to angle S of shaft 115*b*, until T and S differ by 90°.

However, shaft 115*b* is typically driven simultaneously by alignment mechanism 480 toward definite angular relation with $\theta'$ shaft 229, as already described. The resulting rotation of shaft 115*b*, which in the present embodiment may be in either direction, is transmitted through differential 460 to heading shaft 115*c*, and may either increase or oppose the rotation of that shaft produced by the initial differential action already described. The respective rates of turn from those two sources may be determined by selection of the voltages supplied to lines 436 and 437 of alignment mechanism 480 and by selection of the maximum rate at which servo motor 552 drives differential 460. Those rates of turn are preferably substantially equal, so that when oppositely directed they cause little or no net change of course; and are sufficiently small that their sum, when they have the same direction, produces a turn radius having a realistic value. Such a radius is indicated typically at $r_1$ in Fig. 3.

When shaft 115*b* reaches correct alignment with shaft 229, clutch 470 is engaged, as already described, maintaining the relation between the shaft angles S and $\theta'$ indicated in the schematic diagram 580 of Fig. 3. The same diagram represents at $\Delta T$ the difference angle of 90° between shafts 115*b* and 115*c* that is introduced by differential 460 when in equilibrium at large values of $R'$. The resulting aircraft heading T is directly toward program zero 0', producing flight path 406.

As $R'$ decreases and approaches $r_2$, the reference voltage supplied on line 563 to servo 550 decreases correspondingly. Potentiometer 555 and differential 460 are finally driven away from stop 567 toward equilibrium, reducing $\Delta T$ progressively and causing the change of heading represented in Fig. 3 as the turn 407. The value of $R'-r_2$ at which that curve starts may be increased, for example, by increasing the voltage at the point of potentiometer 555 that corresponds to stop 567. And the shape of curve 407 may be controlled, for example, by selection of a potentiometer with suitable response function.

When R' becomes equal to $r_2$, servo 550 maintains differential 460 at its normal position, for which $\Delta T=0$, so that $T=S$. The aircraft heading T is therefore normal to bearing $\theta'$, producing circular flight about 0'. Any tendency of the aircraft to depart from circular flight is corrected by differential action. Execution of the holding pattern may be considered to depend upon a dual type of control. Primary control is exerted by direct drive of shaft 115b from $\theta'$ shaft 229, the shafts being so related as to tend to produce flight normal to bearing angle $\theta'$. Secondary control is exerted via differential 460, which corrects the heading in accordance with any departure of the range R' from the desired value $r_2$. Flight is thus controlled with reference to both the bearing and the range of the aircraft with respect to program zero 0'.

If the artificial aircraft is initially located inside holding pattern 400 at the time main control switch 430 is shifted to position 3, operation of the control system is substantially as has been described, except that the reference signal on line 563 is of opposite polarity, causing servo 550 to drive differential 460 in the opposite direction from its equilibrium position. Heading T is therefore displaced from S toward $\theta'$, instead of away from $\theta'$, tending to produce flight radially outward from program center 0'. As range R' approaches $r_2$, the differential is driven progressively back toward its normal position, producing smooth transition to circular flight, as represented at 411 in Fig. 3.

If the aircraft is desired to execute holding pattern 400 clockwise, instead of counter-clockwise as illustratively described above, it is only necessary, for example, to shift by 180° the relative angular alignment of shafts 115b and 229 that is produced by alignment mechanism 480, and to reverse the direction in which differential 460 is driven for $R'-r_2$ of given sign. For example, set screw 483 may be released, and commutator 482 shifted 180° on its shaft; and a reversing gear may be introduced between servo motor 552 and differential drive shaft 466, leaving the drive of potentiometer 550 unchanged.

The program control system of Fig. 5 includes also means for producing automatically an illustrative type of landing approach flight, which includes a plurality of successive flight stages that may be controlled in accordance with distinct flight variables. It will be understood that the principles of operation of that typical system may be utilized for producing many different types of controlled flight.

To initiate transitional flight from holding pattern 400 to a landing approach such as 422 in Fig. 4, the operator closes control switch 440, main control switch 430 remaining at position 3. An energizing voltage is thereby applied via line 442 to one terminal of the winding of relay II and also, via line 443, to one terminal of the winding of relay IV. However, the opposite terminals of those relays are connected to ground via the cam switches 600 and 630, respectively, so that actuation of those relays can occur only upon closure of the respective cam switches. Cam switch 600 is operated by the cam 602, adjustably fixed, as by the set screw 603, on $\theta'$ shaft 229. Switch 600 closes only at a definite value $\theta'_1$ of bearing angle $\theta'$. After closure of manual switch 440, the aircraft therefore continues along holding pattern 400 until bearing angle $\theta'_1$ is reached. Switch 600 then closes, energizing relay II. A holding circuit to ground is established via relay switch d, holding the relay independently of switch 600 but subject to continued closure of manual switch 440.

Actuation of relay II also opens relay switch a, releasing relay I and thereby releasing bearing clutch 470 and engaging heading clutch 450. Control of intermediate shaft 115b is thus returned to course computer 112. Actuation of switch b of relay II shifts control of the input to course computer 112 from commutator means 480 to line 608, which is connected to the switch arm b of a relay VI. At the time under discussion, that relay is maintained in idle condition by circuitry to be described. Hence line 608 is grounded, supplying zero rate-of-turn signal to course computer 112, and causing its output shaft 115a, and hence also shaft 115b, to remain stationary. Actuation of switch c of relay II supplies ground potential as reference voltage to servo system 550 from line 619 via line 620, normally closed switch b of relay IV, line 622 and servo input line 563. Differential 460 is therefore maintained at its normal position. The aircraft heading remains constant in a direction normal to the bearing angle $\theta'_1$, leading to straight flight as indicated at 420 of Fig. 4.

That flight continues until the y position coordinate of the aircraft reaches a predetermined value $y_1$. Relay VI is then actuated by any suitable control means. As shown, actuating voltage for relay VI is supplied via line 610, normally closed switch a of the relay IV, and line 612 from a switching device indicated at 614. Device 614, which will be referred to as the y-actuator, is responsive to an input signal on line 615, which represents the y position coordinate of the aircraft and may be taken directly from line 128. Actuator 614 may comprise any known means, typically including a differential amplifier, for comparing that input signal with a first reference signal and for supplying to output line 612 a relay actuating voltage only when y is greater than a predetermined value $y_1$. When y is less than $y_1$, line 612 is effectively opened, idling relay VI.

Actuation of relay VI, when y reaches $y_1$, shifts the rate-of-turn signal supplied to course computer 112 from zero to a definite value, determined by the setting of a potentiometer 616. The artificial aircraft heading is thereby caused to change at a rate corresponding to that value, leading to a turn of definite radius $r_3$, as indicated at 421 in Fig. 4, that radius being adjustable at potentiometer 616.

Termination of turn 421 is preferably controlled in terms of the aircraft heading, which may be obtained for reference from heading shaft 115c. As shown, termination of turn 421 is produced by actuation of relays IV and V under control of a switch 630, that action being preferably conditioned upon relay VI being in actuated condition. One terminal of switch 630 is connected via line 635 to the coil of relay IV, its other terminal being connected to ground via line 636 and normally open switch a of relay VI. Switch 630 is arranged for operation by the cam 632, adjustably mounted on heading shaft 115c as by the set screw 633. That cam may be so set as to close switch 630 when heading angle T reaches a value corresponding to the direction of the desired landing approach 422. As shown, that approach path and landing strip axis 416 are parallel to the x coordinate axis and offset therefrom by a distance $y_2$. The value of $y_1$ for which y-actuator 614 is set in preferably so related to $y_2$, $r_3$ and $\theta'_1$ that the y coordinate of the aircraft after completion of turn 421 is substantially equal to $y_2$.

Closure of switch 630 under the heading control just described actuates relay IV only if the artificial aircraft is executing the turn 421. Otherwise the actuating circuit is open at switch a of relay VI, so that switch 630 is disabled. Upon actuation of relay IV closure of relay switch d completes a holding circuit that maintains relay actuation independently of cam switch 630 but still subject to continued closure of manual switch 440. Actuation of relay IV also opens switch a, idling relay VI and returning the rate-of-turn signal to zero. Switch b of relay IV is also opened, lifting ground from input line 563 to servo control 550. Finally, switch $c$ of relay IV closes actuating relays V and VII via lines 637 and 637a. Those relays are shown as separate relays, but may be incorporated as a part of relay IV.

Actuation of relay VII energizes elevation control mechanism to be described. Actuation of relay V causes the servo reference voltage on line 563 to be derived from a different set of variables in place of R' and $r_2$, the new set of variables being appropriate to maintain flight along the desired approach path 422. As shown, relay actuation causes relay switch $a$ to supply to adding resistor 570 the $y$ position signal, taken via the line 640 from line 128; and causes relay switch $b$ to supply to adding resistance 571 a comparison voltage derived from the potentiometer 642 via the line 643. The potentiometer winding is connected between ground and a suitable negative voltage source, and is adjusted to provide a tapped voltage that represents $-y_2$, the negative of the $y$ coordinate of the desired approach path 422. With relay V actuated, the voltage on line 563 then represents the difference $y-y_2$. Supply of that difference voltage as reference voltage to servo 550 causes differential 460 to modify the aircraft heading T in such a way as to maintain the $y$ coordinate equal to $y_2$, producing the desired approach path 422 of Fig. 4.

A further illustrative aspect of the controlled approach pattern concerns automatic elevation control to produce normal let-down along the desired glide path to the landing strip. The desired glide path in elevation typically makes a constant angle $p$, usually about 3°, with the horizontal, and intersects the ground at a point some predetermined distance $d$ from the ground zero. Such a glide path is indicated schematically in Fig. 6 at 700, extending from intersection at 702 with the horizontal initial approach path 704 to touchdown at 706 at the point $x=d$. Throughout approach path 704 and glide path 700, shown in elevation in Fig. 6, the aircraft typically maintains a constant heading, as indicated in plan by approach path 422 in Fig. 4.

The elevation control system as illustrated in Fig. 5 comprises means for instrumenting the desired glide path, illustratively represented by the equation $$z-K(x-d)=0$$

and includes means responsive to the value of $z-K(x-d)$ and acting first to monitor that value until it reaches zero and then to maintain it substantially equal to zero by suitable control of the value of the elevation $z$. The latter control is preferably exerted via the rate-of-climb signal that is supplied on line 103 to $z$ integrator 130, as already described in connection with Fig. 1.

As illustratively shown, a signal representing $-d$, the negative of the distance $d$ in Fig. 6, is developed on line 708 by potentiometer 710. Since $d$ is in normal practice positive, the winding of potentiometer 710 is typically connected between ground and a source of negative potential. The $-d$ signal on line 708 is added, as by the resistances 714 and 715, to the $x$ signal, supplied via line 712 from $x$ integrator 125, already described. The resulting signal on line 716, which represents $x-d$, is supplied to an amplifier 720 of any suitable type, which inverts the input signal and reduces its magnitude by a definite factor K. The value of K, which may be adjustable, corresponds to the tangent of the angle $p$. The output on line 722 from amplifier 720, representing the value $-K(x-d)$, is added, as by the resistances 724 and 725, to the $z$ coordinate signal, which is supplied via line 131 from $z$ integrator 130, already described. The resulting signal on line 730 represents $z-K(x-d)$.

That signal is utilized to perform two distinct functions. It is supplied to $z$-actuator 734, which may comprise a differential amplifier and which acts in response to a definite value of the input signal, zero in the present instance, to produce on output line 736 a positive voltage adapted for actuating a relay. Line 736 is connected via the single normally open switch $a$ of relay VII to one terminal of the winding of relay VIII, the other terminal being grounded. Actuator 734 is therefore disabled at relay VII whenever the latter is in idle condition. As already explained, relay VII is actuated via line 637a along with relays IV and V under control of cam switch 630 upon completion of turn 421 (Fig. 4) by the artificial aircraft. The $z$-actuator is thereby rendered operative to actuate relay VIII in response to the next occurrence of zero signal on line 730, corresponding to intersection of the aircraft path 704 with glide path 700, as indicated at 702 in Fig. 6. The position of intersection 702 depends upon the actual elevation $z_0$ at which the aircraft is flying, it being understood that $z_0$ is not so large that the whole of the approach path 422 lies above the glide path.

Actuation of relay VIII closes switch $d$, completing a holding circuit between a source of positive voltage and line 736, that holding circuit including switch $a$ of relay VII. At the same time, switches $a$, $b$ and $c$ of relay VIII are shifted from their illustrated idle positions, completing a circuit by which the input signal to $z$ integrator 130 is derived from the $z-K(x-d)$ signal on line 730. As shown, that circuit includes an integrating circuit, shown schematically at 740. The signal from line 730 is supplied as input signal to integrator 740 via line 742 and switch $c$ of relay VIII when the latter is actuated. The output of integrator 740 is supplied via relay switch $a$ and line 744 to $z$ integrator 130. Relay actuation also opens the normal connection of line 744 to line 103 at switch $a$, and lifts ground from the terminals of integrator 740 at switches $b$ and $c$.

The described circuitry provides in effect a servo loop that supplies a rate-of-climb signal to $z$ integrator 130 of such magnitude as to maintain substantially zero value of the signal on line 730, which represents $z-K(x-d)$. The artificial aircraft is thereby constrained to fly down the glide path that corresponds to the predetermined values of K and $d$.

At any desired point along glide path 700, or, indeed, of the preceding approach paths 420, 421 and 422, or of holding pattern 400, the artificial aircraft may be returned to manual control by shifting main control switch 430 to position 1. (Switch 440 is preferably returned also to position 1 either at once or at some time before the next cycle of the control system.) Switch arm $c$ of switch 430 then opens the positive voltage supply to commutator 482, preventing actuation of relay I. With relay I idle, clutch 450 is engaged and clutch 470 is released, connecting heading shaft 115c to course computer 112, which receives its rate-of-turn signal via switch arm $a$ of switch 430 from manual turn control 108. Differential 460 is maintained at normal position by grounding of the servo reference voltage on line 563 via switch arm $b$ of switch 430. The azimuth aircraft control is therefore made independent of the described program control system and is subject only to the normal means, shown as manual speed and rate-of-turn controls 105 and 108. Elevation control of the artificial aircraft is similarly returned to manual rate-of-climb control 102, since relay VIII is idled whenever switch $a$ of relay VII is in its normally open position. And relay VII, like relay IV, is necessarily idle whenever approach switch 440 is open. The program control system of Fig. 5 therefore has the advantage that a single manual action may initiate a series of ordered phases of control action; but that that series may be interrupted and the aircraft returned to normal manual control at any desired time.

I claim:

1. An aircraft signal simulator, comprising means for developing a heading signal that represents the heading of an artificial aircraft, means responsive to the heading signal and acting to develop a plurality of position signals that represent respective position variables of the aircraft, manual control means for varying the heading signal to produce a manually controllable flight pattern, automatic control means for varying the heading signal in response to at least one of said position signals to produce a predetermined flight pattern, and switching means for shifting control of the heading signal selectively between the manual control means and the automatic control means.

2. An aircraft signal simulator, comprising means for developing a heading signal that represents the heading of an artificial aircraft, means responsive to the heading signal and acting to develop a plurality of position signals that represent respective position variables of the aircraft, display means acting to indicate those aircraft positions that correspond to the position signals and that are within a predetermined area, sensing means responsive to at least one of the said position signals and acting to develop a control signal when the aircraft position is substantially outside of the said area, and coupling means acting in response to the said control signal to modify the heading signal and thereby to return the aircraft position to the said area.

3. An aircraft signal simulator, comprising means for developing a speed signal and a heading signal that represent, respectively, the speed and heading of an artificial aircraft, means responsive to the speed signal and the heading signal and acting to develop a plurality of position signals that represent respective position variables of the aircraft, display means acting to indicate those aircraft positions that correspond to the position signals and that are within a predetermined area, sensing means responsive to at least one of the said position signals and acting to modify the speed signal and the heading signal, thereby to return the aircraft position to the said area.

4. An aircraft signal simulator, comprising means for developing a heading signal that represents the heading of an artificial aircraft, means responsive to the heading signal and acting to develop range and azimuth signals that represent, respectively, the range and azimuth of the aircraft with respect to a predetermined zero, display means acting to indicate those aircraft positions that correspond to the range and azimuth signals and that are within a circle of predetermined radius about the zero, sensing means responsive to the range signal and acting to modify the heading signal when the aircraft range substantially exceeds the said radius, and thereby to return the aircraft position to the said circle.

5. An aircraft signal simulator, comprising means for developing a heading signal that represents the heading of an artificial aircraft, means responsive to the heading signal and acting to develop range and azimuth signals that represent, respectively, the range and azimuth of the aircraft with respect to a predetermined zero, display means acting to indicate those aircraft positions that correspond to the range and azimuth signals and that are within a circle of predetermined radius about the zero, first sensing means responsive to the range signal and acting to initiate progressive change of the heading signal when the aircraft range substantially exceeds the said radius, and second sensing means responsive to the azimuth signal and acting to terminate the said progressive change of the heading signal when the corresponding heading bears a predetermined relation to the aircraft azimuth.

6. An aircraft signal simulatr, comprising means for developing a heading signal that represents the direction of flight of an artificial aircraft, means responsive to the heading signal and acting to develop a plurality of position signals that represent respective position variables of the aircraft, display means acting to indicate aircraft positions that correspond to the position signals, and control means including a time control and acting intermittently at substantially randomly distributed times to modify the action of the first said means and thereby to produce substantially random changes in the direction of flight of the artificial aircraft.

7. An aircraft signal simulator, comprising means for developing a heading signal that represents the direction of flight of an artificial aircraft, said means acting in response to an input rate-of-turn signal, means responsive to the heading signal and acting to develop position signals that represent the position of the aircraft, means acting to develop a control signal that varies with time, and means acting to supply the control signal intermittently as rate-of-turn signal to the said means for developing a heading signal, and thereby to produce substantially random changes in the direction of flight of the artificial aircraft.

8. An aircraft signal simulator, comprising means for developing a heading signal that represents the heading of an artificial aircraft and that varies in accordance with an input rate-of-turn signal, means responsive to the heading signal and acting to develop position signals that represent the position of the aircraft, signal generating means acting to develop a control signal that varies periodically, coupling means actuable to supply the control signal as rate-of-turn signal to the said means for developing a heading signal, and control means for actuating the coupling means during time periods that are short compared to the period of variation of the control signal and that are separated by times that are long compared to that period of variation.

9. An aircraft signal simulator, comprising means for developing a heading signal that represents the direction of flight of an artificial aircraft, means responsive to the heading signal and acting to develop range and azimuth signals that represent, respectively, the range and azimuth of the aircraft with respect to a predetermined zero, means acting to compare the heading signal and the azimuth signal and to develop a control signal in response to a predetermined relation thereof, and means acting in response to said control signal to control the action of the first said means and thereby to modify the direction of flight of the artificial aircraft.

10. An aircraft signal simulator, comprising means for developing a heading signal that represents the heading of an artificial aircraft, means responsive to the heading signal and acting to develop range and azimuth signals that represent, respectively, the range and azimuth of the aircraft with respect to a predetermined zero, and coupling means actuatable to cause the heading signal to have a predetermined relationship to the azimuth signal when the aircraft range has a predetermined value, said coupling means including means acting under control of the range signal to vary that relationship in one direction when the aircraft range is less than said value and in the other direction when the aircraft range exceeds that value.

11. An aircraft signal simulator, comprising a heading shaft that represents the heading of an artificial aircraft, means for developing a speed signal that represents the speed of the aircraft, a bearing shaft that represents the bearing of the aircraft with respect to a predetermined zero, means for driving the bearing shaft under control of the heading shaft and the speed signal, and means for driving the heading shaft under control of the bearing shaft.

12. An aircraft signal simulator, comprising a heading shaft that represents the heading of an artificial aircraft, means for developing a speed signal that represents the speed of the aircraft, a bearing shaft that represents the bearing of the aircraft with respect to a predetermined zero, means for driving the bearing shaft under control of the heading shaft and the speed signal, means actuable to drive the heading shaft into a predetermined relation with the bearing shaft, and clutch means engageable between the heading shaft and the bearing shaft in response to existence of the said relation.

13. An aircraft signal simulator, comprising a heading shaft, that represents the heading of an artificial aircraft, means for developing a speed signal that represents the speed of the aircraft, a bearing shaft that represents the bearing of the aircraft with respect to a predetermined zero, means acting under control of the heading shaft and the speed signal to drive the bearing shaft and to develop a range signal that represents the range of the aircraft with respect to the zero, and coupling means between the bearing shaft and the heading shaft, said coupling means including differential means acting under control of the range signal to vary the rotational relation between the shafts.

14. An aircraft signal simulator, comprising a heading shaft that represents the heading of an artificial aircraft, means for developing a speed signal that represents the speed of the aircraft, a bearing shaft that represents the bearing of the aircraft with respect to a predetermined zero, means acting under control of the heading shaft and the speed signal to drive the bearing shaft and to develop a range signal that represents the range of the aircraft with respect to the zero, and coupling means between the bearing shaft and the heading shaft, said coupling means including clutch means engageable between the shafts to maintain a rotational relation between them, differential means acting to modify the said rotational relation under control of the range signal, and means actuable to produce clutch engagement, the last said means acting to drive the heading shaft and the bearing shaft to the said modified rotational relation and to cause clutch engagement in response to existence of that relation.

15. An aircraft signal simulator, comprising means for developing two position signals that represent, respectively, horizontal and vertical position variables of an artificial aircraft in a vertical plane, control means responsive to said position signals and acting to develop a control signal that represents a definite function of said position variables, said function having a definite value for all points on a predetermined glide path in said plane, and coupling means responsive to said control signal and acting to modify the action of the means for developing the position signals and thereby to maintain the control signal substantially at its said definite value.

16. An aircraft signal simulator, comprising means for developing $x$ and $z$ position signals that represent, respectively, horizontal and vertical cartesian position coordinates of an artificial aircraft, control means responsive to said position signals and acting to develop a control signal that represents the value of the function $z-K(x-d)$ in which $K$ and $d$ are constants, and coupling means responsive to said control signal and acting to modify the action of the means for developing the $z$ position signal and thereby to maintain said control signal substantially equal to zero.

17. An aircraft signal simulator, comprising means for developing $x$ and $z$ position signals that represent, respectively, horizontal and vertical cartesian position coordinates of an artificial aircraft, control means responsive to said position signals and acting to develop a control signal that represents the value of the function $z-K(x-d)$ in which $K$ and $d$ are constants, first coupling means responsive to said control signal and actuable to modify the action of the means for developing the $z$ position signal and thereby to maintain said control signal substantially equal to zero, and second coupling means responsive to the said control signal and acting to actuate the first coupling means when the control signal passes through the value zero.

18. An aircraft signal simulator, comprising means for developing two sets of position signals that represent, respectively, the position of the aircraft with respect to a ground zero and with respect to a program zero, coupling means between at least one of the position signals that correspond to the program zero and the said means for developing position signals, said coupling means acting to control the developed position signals in response to the value of said one position signal and thereby to produce a predetermined flight pattern of the artificial aircraft with respect to the program zero, and display means acting under control of the position signals that correspond to the ground zero to indicate the aircraft position with respect to the ground zero.

19. An aircraft signal simulator, comprising means for developing two sets of cartesian position signals that represent the position of the aircraft with respect to the ground zero and to a program zero, respectively, the program zero being spaced from the ground zero, resolving means acting under control of the cartesian position signals that correspond to the program zero to develop at least one polar position signal that represents a polar coordinate of the artificial aircraft with respect to the program zero, coupling means between the resolving means and the said means for developing the cartesian position signals, said coupling means acting to control the developed heading signal in response to the polar position signal and thereby to produce a predetermined flight pattern of the artificial aircraft with respect to the program zero, and display means acting under control of the cartesian position signals that correspond to the ground zero to indicate the aircraft position represented by those signals.

20. An aircraft signal simulator for use with a display system of the type that produces a cathode ray tube display of the position of a target with respect to a predetermined ground zero, said aircraft signal simulator comprisng means for developing a heading signal that represents the heading of an artificial aircraft, means responsive to the heading signal and acting to develop two initial cartesian position signals that represent, respectively, two cartesian coordinates of the position of the aircraft with respect to a first zero, means acting to develop two shifted cartesian position signals that represent, respectively, cartesian coordinates of the position of the aircraft with respect to a second zero spaced from the first, one of those zeros corresponding to the said ground zero and the other corresponding to a program zero, resolving means acting under control of the cartesian position signals that correspond to the program zero to develop at least one polar position signal that represents a polar coordinate of the artificial aircraft with respect to the program zero, coupling means between the resolving means and the said means for developing the heading signal, said coupling means acting to control the developed heading signal in response to the polar position signal and thereby to produce a predetermined flight pattern of the artificial aircraft with respect to the program zero, and means acting under control of the cartesian position signals that correspond to the ground zero to modulate the intensity of the cathode ray beam and thereby to indicate on the tube screen the position represented by those signals.

21. An aircraft signal simulator for use with a display system of the type that produces a cathode ray tube display of the position of a target with respect to a predetermined ground zero, said aircraft signal simulator comprising means for developing a heading signal that represents the heading of an artificial aircraft, means responsive to the heading signal and acting to develop two sets of cartesian position signals that represent the position of the aircraft with respect to the ground zero and to a program zero, respectively, the program zero being spaced from the ground zero, resolving means acting under control of the cartesian position signals that correspond to the program zero to develop a range signal that represents the range of the aircraft with respect to the program zero, coupling means between the resolving means and the said means for developing the heading signal, said coupling means acting to modify the developed heading signal under control of the range signal, and means acting under control of the cartesian position signals that correspond to the ground zero to modulate the intensity of the cathode ray beam and thereby to indicate on the tube screen the position represented by those signals.

22. An aircraft signal simulator for use with a display system of the type that produces a cathode ray tube display of the position of a target with respect to a predetermined ground zero, said aircraft signal simulator comprising means for developing a heading signal that represents the heading of an artificial aircraft, means responsive to the heading signal and acting to develop two sets of cartesian position signals that represent the position of the aircraft with respect to the ground zero and to a program zero, respectively, the program zero being spaced from the ground zero, resolving means acting under control of the cartesian position signals that correspond to the program zero to develop an angle signal that represents a position angle of the aircraft with respect to the program zero, coupling means between the resolving means and the said means for developing the heading signal, said coupling means acting to control the developed heading signal under control of the angle signal, and means acting under control of the cartesian position signals that correspond to the ground zero to modulate the intensity of the cathode ray beam and thereby to indicate on the tube screen the position represented by those signals.

References Cited in the file of this patent

UNITED STATES PATENTS

| | | |
|---|---|---|
| 2,471,315 | Dehmel | May 24, 1949 |
| 2,531,400 | Clarkson | Nov. 28, 1950 |
| 2,553,529 | Dehmel | May 15, 1951 |
| 2,674,812 | Hales | Apr. 13, 1954 |
| 2,691,226 | Gaertner et al. | Oct. 12, 1954 |
| 2,693,647 | Bolster et al. | Nov. 9, 1954 |
| 2,715,497 | Droz et al. | Aug. 16, 1955 |